US006295114B1

(12) United States Patent
Agano et al.

(10) Patent No.: US 6,295,114 B1
(45) Date of Patent: Sep. 25, 2001

(54) IMAGE RECORDING APPARATUS AND HEAT DEVELOPMENT RECORDING APPARATUS

(75) Inventors: Toshitaka Agano; Nobuyuki Torisawa, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/138,668

(22) Filed: Aug. 24, 1998

(30) Foreign Application Priority Data

Aug. 25, 1997 (JP) .................................................. 9-228364
Aug. 26, 1997 (JP) .................................................. 9-229643

(51) Int. Cl.$^{7}$ .......................... G03B 27/32; G03B 27/52; G03B 27/00

(52) U.S. Cl. ............................... 355/27; 355/40; 355/405

(58) Field of Search ................................ 355/27–29, 40, 355/41, 402, 405; 399/122, 123, 128, 129; 347/187, 188

(56) References Cited

U.S. PATENT DOCUMENTS

| | | | | |
|---|---|---|---|---|
| 3,709,472 | * | 1/1973 | Kreitz et al. | 263/6 |
| 4,402,599 | * | 9/1983 | Seto | 355/77 |
| 4,437,757 | * | 3/1984 | Komori et al. | 355/15 |
| 5,130,755 | * | 7/1992 | Ikegawa et al. | 355/296 |
| 5,237,368 | * | 8/1993 | Itoh et al. | 355/202 |
| 5,293,537 | * | 3/1994 | Carrish | 355/285 |
| 5,398,052 | * | 3/1995 | Isaka et al. | 347/233 |
| 5,568,243 | * | 10/1996 | Durfee et al. | 355/299 |
| 5,873,021 | * | 2/1999 | Hatta et al. | 399/358 |

* cited by examiner

*Primary Examiner*—Russell Adams
*Assistant Examiner*—Hung Henry Nguyen
(74) *Attorney, Agent, or Firm*—Sughrue, Mion, Zinn, Macpeak & Seas, PLLC

(57) ABSTRACT

Disclosed is an image recording apparatus for forming an image on a heat development photosensitive material or a light- and heat-sensitive recording material through a dry processing, said image recording apparatus being capable of continuously recording high-quality images over a long period of time by providing a heat development part with a cleaning mechanism therefor and including a storage part in which the recording material is stored; a latent-image forming mechanism which forms a desired latent image on the recording material conveyed from the storage part; a heat development mechanism which develops the recording material and includes a heating member for heating at a given temperature the recording material conveyed from the latent-image forming mechanism and a press contact member for pressing the recording material against the heating member; and a cleaning mechanism which cleans that contact surface of at least one of the heating member and the press contact member which comes into contact with the recording material. A heat development apparatus in which dust particles adherent to the heating drum are removed and the formation of dot image defects is thus prevented to thereby give a high-quality image is also disclosed.

6 Claims, 9 Drawing Sheets

IMAGE RECORDING APPARATUS AND HEAT DEVELOPMENT RECORDING APPARATUS

FIELD OF THE INVENTION

The present invention relates to a heat development photosensitive material recording apparatus in which a heat development photosensitive material or a light- and heat-sensitive recording material is used as a recording film and an image is recorded thereon and developed.

The present invention also relates to a heat development apparatus applied to recording in a dry system such as image recording on a dry-process material without via a wet processing.

BACKGROUND OF THE INVENTION

Conventional image recording apparatuses for recording medical images, e.g., CT and MR apparatuses, employ a wet processing system in which a silver salt photographic material is subjected to photographing or recording and then to a wet processing to obtain a reproduced image.

In contrast, a recording apparatus based on a dry processing system not involving a wet processing is recently attracting attention. Examples of such recording apparatuses include an image recording apparatus employing a film of a heat development photosensitive material (hereinafter referred to as "recording film").

In such a heat development photosensitive material recording apparatus, a recording film is irradiated with laser light (exposure) to form a latent image on the recording film. This recording film is heated to thereby develop the latent image. The exposure is generally accomplished by scanning the film with the laser (primary scanning) while controlling the laser output according to image data. It is a matter of course that during this exposure, the recording film is moved in a given direction (secondary scanning). On the other hand, development is generally accomplished by contacting the recording film to a heating member.

Documents dealing with such heat development photosensitive material recording apparatuses include, for example, International Publication WO 95/31754 and International Publication WO 95/30934.

Recording films are produced and packaged under strict quality control so as to eliminate dust particles and other foreign matters therefrom. However, such recording films are used in recording apparatuses which themselves have been installed in the air, and the insides of the apparatuses are open to the air at the time of recording film setting. Hence, the recording apparatuses frequently contain accumulated dust particles and the like which have entered thereinto. As a result, there are cases where dust or other particles adhere to a recording film during the steps of the exposure, development, and conveyance of the recording film.

Such dust or other particles adherent to the film are left in the final step of the recording apparatus, that is, the foreign particles adhere to the heat development part and reside therein. As a result, the foreign particles may damage the recording film or otherwise influence image quality. Despite this, none of the conventional image recording apparatuses has a mechanism for removing dust particles and the like, and there has been a fear from the standpoint of maintaining image quality over long.

On the other hand, image recording apparatuses for recording a medical image on a heat storage type fluorescent sheet, such as digital radiography systems and CT and MR apparatuses, employ a wet system in which a silver salt photographic material is subjected to photographing or recording and then to a wet processing to obtain a reproduced image.

In contrast, a recording apparatus based on a dry system in which a wet processing is not conducted is recently attracting attention. Such recording apparatuses employ a film of a photosensitive and/or thermosensitive recording material (light- and heat-sensitive recording material) or a film of a heat development photosensitive material (hereinafter referred to as "recording material"). In a recording apparatus based on the dry system, a recording material is irradiated with a laser beam in an exposure part (scanning) to form a latent image, and the recording material is then brought into contact with a heating means, e.g., a heating drum, in a heat development part to conduct heat development. Thereafter, the recording material having an image formed thereon is discharged from the apparatus.

Such a dry system is advantageous in that it not only is capable of forming an image in a shorter time period than wet processings, but also is free from the problem of waste water treatment in wet processings. The demand for such dry systems is fully expected to grow in the future.

In the dry system described above, even slight fluctuations of development temperature result in considerably impaired image quality, because the recording material used has higher sensitivity so as to cope with the desired high image quality especially in medical use.

However, there are cases where dust particles which have come into the recording apparatus as a result of recording material conveyance adhere to the surface of the heating drum. This interposition of dust particles between a recording material and the heating drum results in the formation of dot image defects in those areas of the recording material which are in contact with the dust particles.

SUMMARY OF THE INVENTION

An object of the present invention is to provide an image forming apparatus for forming an image on a recording material such as a heat development photosensitive material, more particularly, an image recording apparatus equipped with a mechanism for cleaning the heat development part.

Another object of the present invention is to provide a heat development apparatus in which dust particles adherent to the heating drum are removed and the formation of dot image defects is thus prevented to thereby give a high-quality image.

The present invention has been achieved in order to accomplish the above objects. The first embodiment of the present invention (embodiment 1) provides an image recording apparatus for forming an image on a heat development photosensitive material or a light- and heat-sensitive recording material through a dry processing, said image recording apparatus comprising: a storage part in which the recording material is stored; latent-image forming means which forms a desired latent image on the recording material conveyed from the storage part; heat development means which develops the recording material and comprises a heating member for heating at a given temperature the recording material conveyed from the latent-image forming means and a press contact member for pressing the recording material against the heating member; and cleaning means which cleans a contact surface of at least one of the heating member and the press contact member which comes into contact with the recording material.

The image recording apparatus can have a constitution wherein the cleaning means has a cleaning sheet which comes into tight contact or sliding contact with the contact surface to thereby clean the surface.

The image recording apparatus can have a constitution wherein the cleaning means has a cleaning sheet conveyance circuit, and the contact surface is present within the circuit.

The image recording apparatus can have a constitution wherein the cleaning means has control means having a cleaning mode in which the latent-image forming part is inhibited from operating to form a latent image and the cleaning sheet stored beforehand in the storage part is conveyed to the heat development part by the conveyance means and brought into tight contact or sliding contact with the contact surface to thereby clean the contact surface.

The image recording apparatus can have a constitution wherein the control means comes into the cleaning mode upon power turning on.

The image recording apparatus can have a constitution wherein the control means has a cleaning instruction switch for receiving instructions from the user for the execution of cleaning, and comes into the cleaning mode upon reception through the cleaning instruction switch of the instructions for the execution of cleaning.

Furthermore, the image recording apparatus can have a constitution wherein the cleaning sheet is placed on top of a set of a given number of sheets of the recording material to be loaded in the storage part, and the control means comes into the cleaning mode when the set of sheets of the recording material is freshly loaded in the storage part.

The control means preferably comes into an ordinary heat development mode after the cleaning operation is conducted a given number of times in the cleaning mode.

The second embodiment of the present invention (embodiment 2) provides a heat development recording apparatus which has a heat development part in which a heat development photosensitive material bearing a latent image or a light- and heat-sensitive recording material bearing a latent image is brought into contact with a heating drum to thereby obtain a visible image, said recording apparatus having dust removing means having surface tackiness disposed in contact with the heating drum.

According to the heat development apparatus described above, the surface of the heating drum is always kept clean due to the dust removing means, whereby the deterioration in image quality caused by dust particle adhesion is prevented.

DETAILED DESCRIPTION OF THE INVENTION

Figure 1:
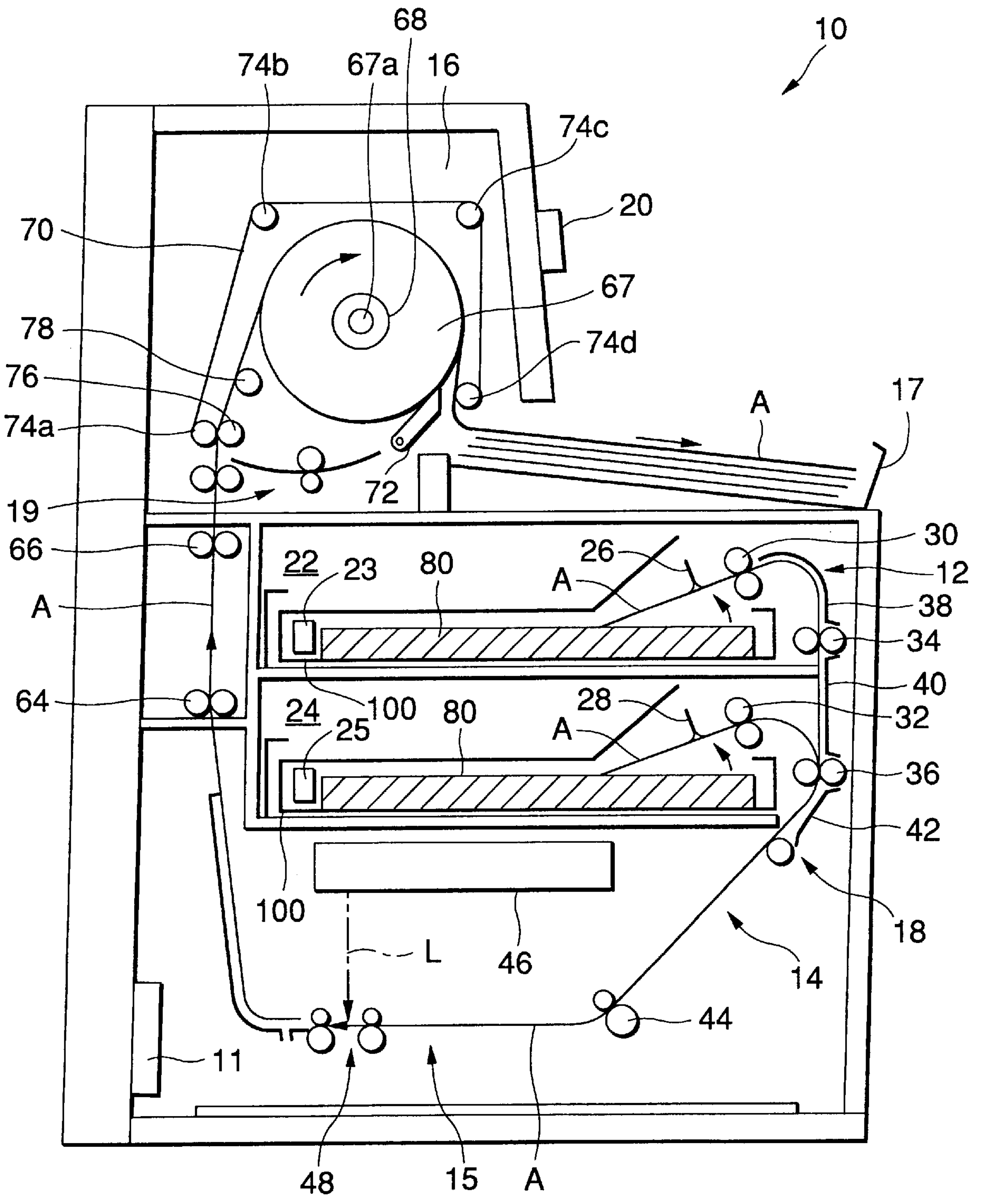
FIG. 1 is a schematic view diagrammatically illustrating a recording apparatus as a first embodiment of the present invention.

Embodiment 1 of the present invention will be explained by reference to drawings.

This embodiment of the image recording apparatus is an apparatus which employs a heat development photosensitive material not requiring a wet processing (hereinafter referred to as "recording material A"), and in which the recording material A is image-wise exposed to light by scanning with a light beam L to thereby form a latent image and heat development is then conducted to obtain a visible image. The most characteristic feature of this embodiment resides in that it has a cleaning mechanism 19 for a heating drum 67, as will be described later.

The heat development photosensitive material for use in the present invention is a recording material on which an image can be recorded with at least one light beam such as a laser beam (exposure) and then colored by heat development. Examples of the heat development photosensitive material include a recording material comprising a substrate and, formed on one side thereof, an image forming layer comprising a binder at least 50% of which is accounted for by a latex and containing a reducing agent for an organosilver salt (hereinafter referred to as "first recording material").

The present invention is also applicable to an image recording apparatus used for recording an image on a light- and heat-sensitive recording material. This light- and heat-sensitive recording material is a recording material in which an image is recorded with at least one light beam such as a laser beam (exposure) and then colored by heat development, or in which an image is recorded and simultaneously colored by means of either a laser beam in a heat mode (heat) or a thermal head and the resultant colored image is fixed by light irradiation. Examples of this light- and heat-sensitive recording material include a recording material comprising a substrate and formed thereon a light- and heat-sensitive recording layer which contains an electron-donating colorless dye encapsulated in heat-responsive microcapsules and further contains, outside the heat-responsive microcapsules, a compound having an electron-accepting part and a polymerizable vinyl monomer part in the same molecule and a photopolymerization initiator ("second recording material").

Another example of the light- and heat-sensitive recording material is a recording material (hereinafter referred to as "third recording material") comprising a substrate and formed thereon a light- and heat-sensitive recording layer which contains an electron-donating colorless dye encapsulated in heat-responsive microcapsules and further contains, outside the heat-responsive microcapsules, an electron-accepting compound, a polymerizable vinyl monomer, and a photopolymerization initiator.

The present invention will be explained below in detail.

The embodiment 1 of the present invention is an image recording apparatus 10, whose constitution is explained by reference to FIG. 1.

The image recording apparatus 10 (hereinafter referred to as "recording apparatus 10") has a recording material feed part 12, a sideway register part 14, an image-wise exposure part 15, a heat development part 16, a tray 17, a conveying mechanism 18, a cleaning mechanism 19, an operation panel 20, and a main controller 11.

The conveying mechanism 18 serves to convey a recording material A along a given conveyance path formed within the recording apparatus 10. This conveying mechanism 18 specifically comprises conveying roller pairs 34, 36, 44, 64, and 66 disposed along the conveyance path, a conveying mechanism driving motor 21 for driving these roller pairs (see FIG. 5), conveyance guides 38, 40, 42, etc. which form the conveyance path. Furthermore, a conveying means for secondary scanning 48 and a heating drum 67, which both will be described later, and others serve also as part of the conveying mechanism 18. The recording material feed part 12, sideway register part 14, image-wise exposure part 15, heat development part 16, and tray 17 are arranged in this order from the upstream side of conveyance of the recording material A.

The recording material feed part 12 (hereinafter referred to as "feed part 12") serves to take up, one by one, sheets of the recording material A stored in a magazine 100 and feed the same to the sideway register part 14 located downstream in the conveyance direction (hereinafter referred to simply as "downstream"). The feed part 12 comprises loading parts 22 and 24, a sheet feeding means employing suckers 26 and 28 disposed respectively at the loading parts, feed roller pairs 30 and 32, and loading sensors 23 and 25.

The loading parts 22 and 24 each is a part in which the magazine 100 containing a recording material A is loaded. This embodiment of the recording apparatus 10 has two loading parts (loading parts 22 and 24). In general, magazines 100 containing recording materials A of different sizes are loaded in the loading part 22 and the loading part 24, respectively. For example, a recording material A of half size for CT or MRI can be stored in one loading part, and a recording material A of B4 size for FCR (Fuji Computed Radiography) can be stored in the other. Each recording material A is stored as a stack of sheets thereof in a package 80, and this package 80 containing the recording material A is stored in a magazine 100.

The sheet feeding means disposed in each of the loading parts 22 and 24 serves to take up, one by one, sheets of the recording material A from the magazine 100 according to instructions from the main controller 11 and feeds the sheets to the feed roller pair 30 or 32 disposed respectively in the loading part 22 or 24. Specifically, the sucker 26 or 28 holds the recording material A by suction, and the sucker 26 or 28 in this state is transferred by a known transfer means comprising a linkage (not shown), a driving motor 27 or 29 for operating the same (see FIG. 5), etc. to thereby convey the recording material A. The loading parts 22 and 24 are equipped with loading sensors 23 and 25, respectively, which detect the loading of a fresh magazine 100. This recording apparatus has such a constitution that the loading sensors 23 and 25 output detection results to the main controller 11.

The feed roller pairs 30 and 32 each serves to send the recording material A taken up from the magazine 100 by the sheet feeding means to the conveying mechanism 18 (the conveying roller pair 34 or 36, etc.). These feed roller pairs 30 and 32 also are operated by the driving motors 27 and 29 according to instructions from the main controller 11.

The recording material A sent to the conveyance path by the feed roller pair 30 is thereafter conveyed further by the conveying mechanism 18. Specifically, this recording material A is conveyed to the downstream sideway register part 14 by the conveying roller pairs 34 and 36 while being guided by conveyance guides 38, 40, and 42. On the other hand, the recording material A fed to the feed roller pair 32 is conveyed to the downstream sideway register part 14 by the conveying roller pair 36 while being guided by the conveyance guides 40 and 42.

The sideway register part 14 is a part in which a recording material A is positioned with respect to the direction perpendicular to the direction of conveyance (hereinafter, that direction for positioning is referred to as "width direction") to thereby position the recording material A with respect to the direction of primary scanning in the downstream image-wise exposure part 15 (so-called "side resist").

The recording material A which has been positioned in the sideway register part 14 is conveyed to the downstream image-wise exposure part 15 by the conveying mechanism 18 (the conveying roller pair 44 in this stage).

The image-wise exposure part 15 (hereinafter referred to as "exposure part 15") is a part in which the recording material A is image-wise exposed by means of light beam scanning. The exposure part 15 in the embodiment 1 comprises an exposure unit 46 and a conveying means for secondary scanning 48.

Figure 2:
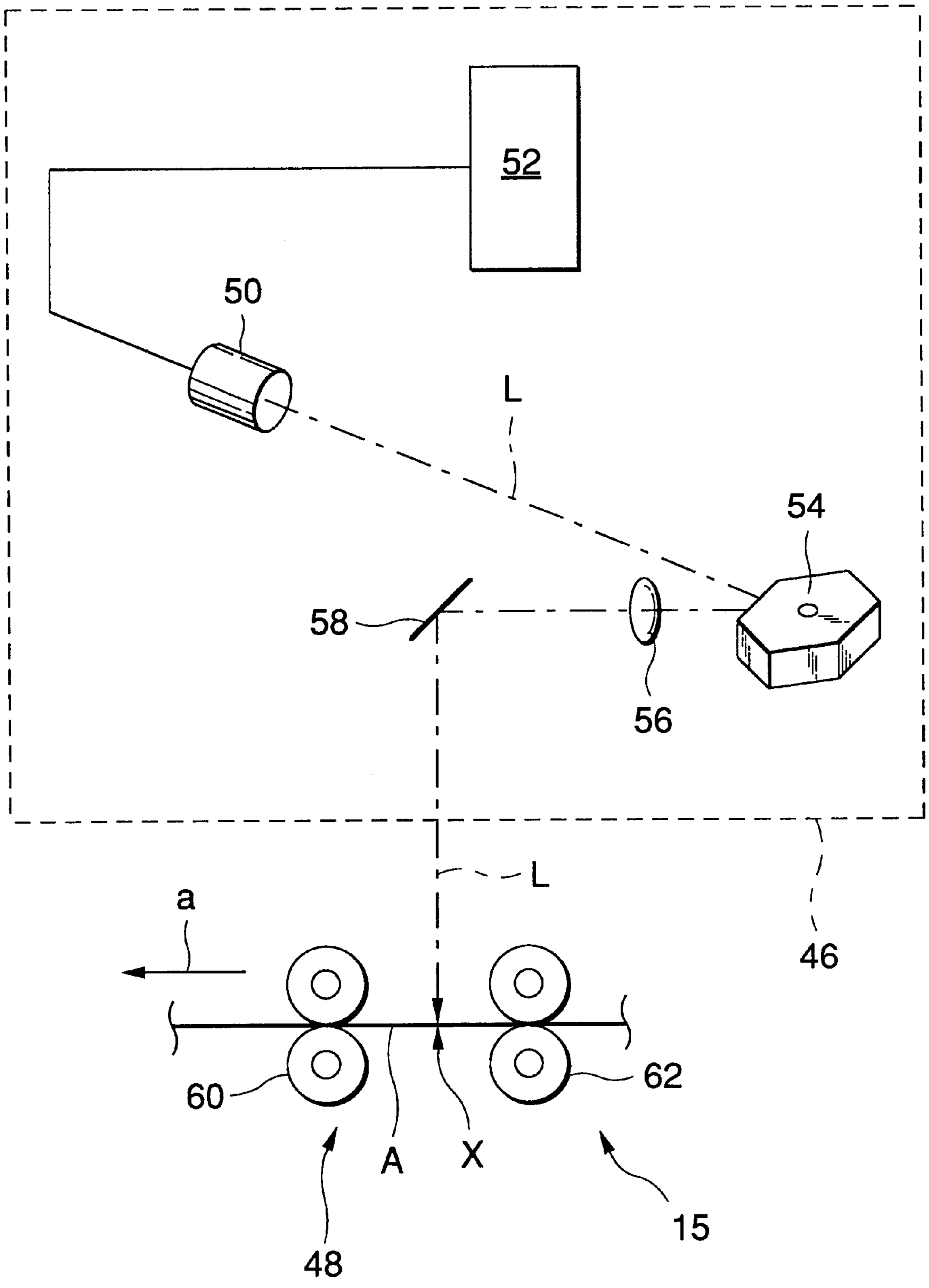
FIG. 2 is a view diagrammatically illustrating the exposure unit.

As shown in FIG. 2, the exposure unit 46 has such a constitution that a light beam L emitted by a light source 50 is deflected with a polygon mirror 54, an fθ lens 56, a down mirror 58, etc. in the direction of primary scanning (the direction perpendicular to the page in FIGS. 1 and 2) while being modulated (pulse duration modulation in this embodiment) by a recording controller 52 according to an image to be recorded (image data) to thereby cause the deflected light beam L to strike on a given recording position X.

The conveying means for secondary scanning 48 conveys the recording material A, by means of conveying roller pairs 60 and 62, in the direction of secondary scanning (the direction indicated by arrow "a" in FIG. 2) which is perpendicular to the direction of primary scanning, while holding the recording material A in the recording position X. The light beam L used here for exposure is continuously deflected in the direction of primary scanning. As a result, the recording material A is two-dimensionally exposed to light by means of scanning with the light beam, whereby a latent image is recorded. The conveyance mechanism driving motor 21 functions also to actuate the conveying roller pairs 60 and 62.

This exposure part 15 operates according to instructions from the main controller 11. The image to be recorded (image data) based on which light beam modulation is conducted is input externally (e.g., from an FCR reader or a CT or MRI apparatus).

The recording material A on which a latent image has been recorded in the exposure part 15 is then conveyed to the heat development part 16 by the conveying mechanism 18 (the conveying roller pairs 64 and 66, etc. in this stage).

Figure 3:
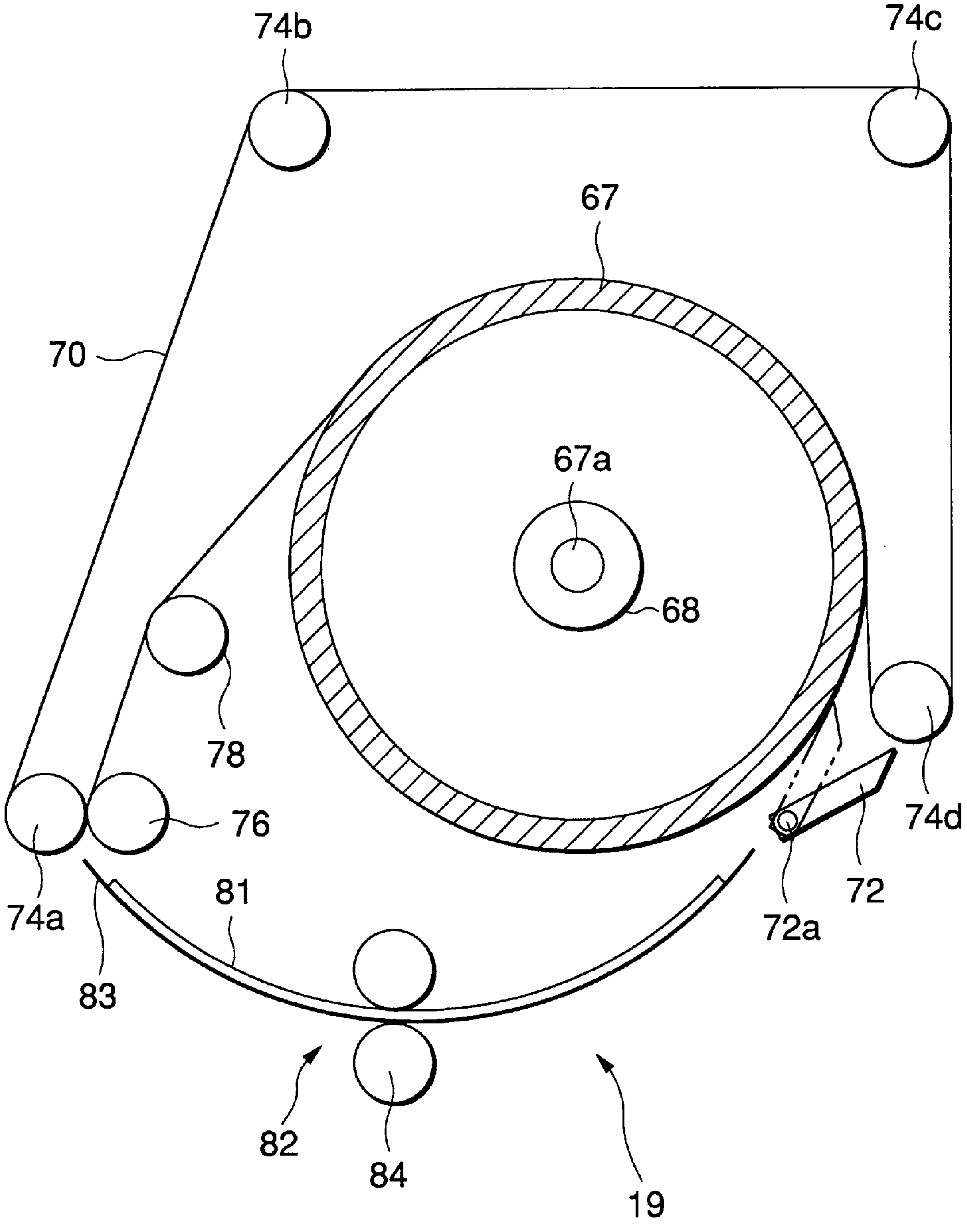
FIG. 3 is a view illustrating the constitutions of the heat development part and the cleaning mechanism.

The heat development part 16 is a part in which the recording material A bearing a latent image is heated (heat development) to thereby visualize the latent image. As shown in FIG. 3, this heat development part 16 comprises a heating drum 67, an endless belt 70, a peeling claw 72, and conveying rollers 76 and 78.

The heating drum 67 contains a built-in heat source 68 so that the surface thereof can be heated to and kept at a temperature corresponding to the heat development temperature of the recording material A. Besides being an ordinary heater, the heat source 68 may be a light source for heating, e.g., a halogen lamp, or the like.

Figure 5:
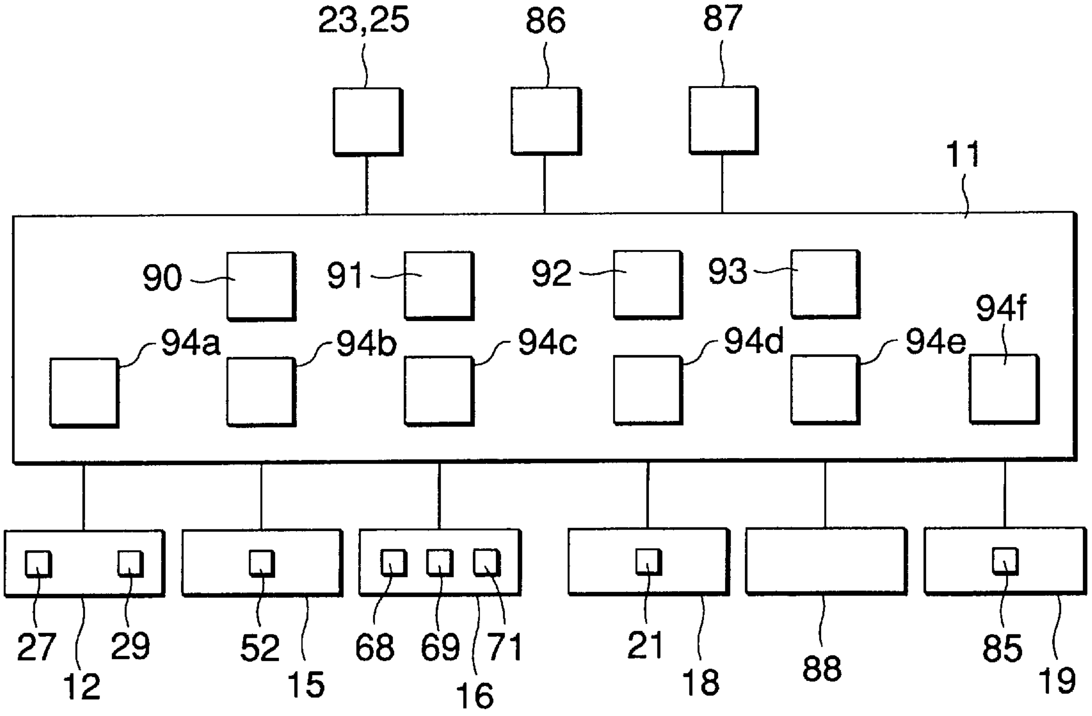
FIG. 5 is a block diagram illustrating an important part of the constitution for control.

The heating drum 67 has been constituted so as to be rotatable on a shaft 67*a*, and is rotated or operated by a heating drum driving motor 69 (see FIG. 5). Thus, the heating drum 67 and the endless belt 70 in cooperation transfer the recording material A while sandwiching the same therebetween. The rotation of the heating drum 67 and the heating thereof by the built-in heating source 68 are entirely controlled according to instructions from the main controller 11.

The temperature of the heating drum 67 is suitably regulated according to properties of the recording material A. The speed of conveyance by the heating drum 67 (i.e., heat development time) is also suitably regulated according to properties of the recording material A. When the first recording material described hereinabove is used as the recording material A, a drum temperature of from 100 to 140° C. is preferred. When the second recording material is used, a drum temperature of from 85 to 150° C. is preferred. The heat development time for the first recording material is preferably about from 10 to 90 seconds, while that for the second recording material is preferably about from 3 to 60 seconds.

The endless belt 70 serves to press a recording material A against the heating drum 67. This endless belt 70 is stretched by four rollers, i.e., rollers 74*a*, 74*b*, 74*c*, and 74*d*, and wound approximately in the shape of the letter U around the heating drum 67. Since that region of the endless belt 70 to which a recording material A is conveyed first is apart from the heating drum 67, the recording material A which is being conveyed in this region is sandwiched between the endless belt 70 and conveying rollers 76 and 78. Further, the endless belt is driven by an endless belt driving motor 71 (not shown in FIGS. 1 and 3).

The peeling claw 72 serves to peel a recording material A from the heating drum 67. This peeling claw 72 has been constituted so that it rocks around a shaft 72*a* to thereby be capable of coming into light contact with and separating from the surface of the heating drum 67. Namely, the peeling claw 72 has been constituted so that it comes into light contact with or separates from the heating drum 67 according to the conveyance of a recording material A by the heating drum 67 and to the operation mode (ordinary mode/cleaning mode, which will be described later).

The tray 17 is used for stacking thereon sheets of the recording material A which have undergone development and discharged from the heat development part 16.

The cleaning mechanism 19 serves to remove soils adherent to surfaces in the heat development part 16 (in particular, the heating drum 67 and the endless belt 70). As shown in FIG. 3, this cleaning mechanism 19 has a cleaning sheet 81 and a holding/circulating mechanism 82 for holding the cleaning sheet 81 and sending the same according to need to the heat development part 16 in a circulative manner.

The cleaning sheet 81 comes into contact with the heating drum 67 and the endless belt 70 to thereby remove the soils adherent to the surfaces thereof. Since the cleaning sheet 81 in this embodiment is circulated so as to perform cleaning two or more times as will be described later, the length of the cleaning sheet 81 is not particularly limited. However, the cleaning sheet 81 in this embodiment has a length larger than the circumferential length of the heating drum 67 from the standpoint of heightening the cleaning efficiency. There are two types of cleaning sheets, i.e., those which scrape off soils and those which remove soils adhesively, and either of these types can be used. A cleaning sheet of the optimal type can be suitably selected according to the material and constitution of the heating drum surface, etc.

The holding/circulating mechanism 82 serves to hold the cleaning sheet 81 and send the same according to need to the heat development part 16 repeatedly in a circulative manner. Specifically, this holding/circulating mechanism 82 comprises a guide 83, a driving roller pair 84, and a cleaning sheet driving motor 85 (see FIG. 5).

The guide 83 constitutes a conveyance path for the cleaning sheet 81 which path connects the outlet for a recording material A from the heat development part 16 (the area around the peeling claw 72) to the inlet therefor to the heat development part 16 (the area around the conveyance roller 76). Since this conveyance path functions also as a storage part for the cleaning sheet 81 when cleaning is not conducted (in the ordinary mode), the length thereof is longer at least than the conveyance-direction length of the cleaning sheet 81.

The driving roller pair 84 serves to convey the cleaning sheet 81 in the conveyance path formed by the guide 83. This driving roller pair 84 is actuated by the cleaning sheet driving motor 85, which operates according to instructions from the main controller 11.

Figure 4:
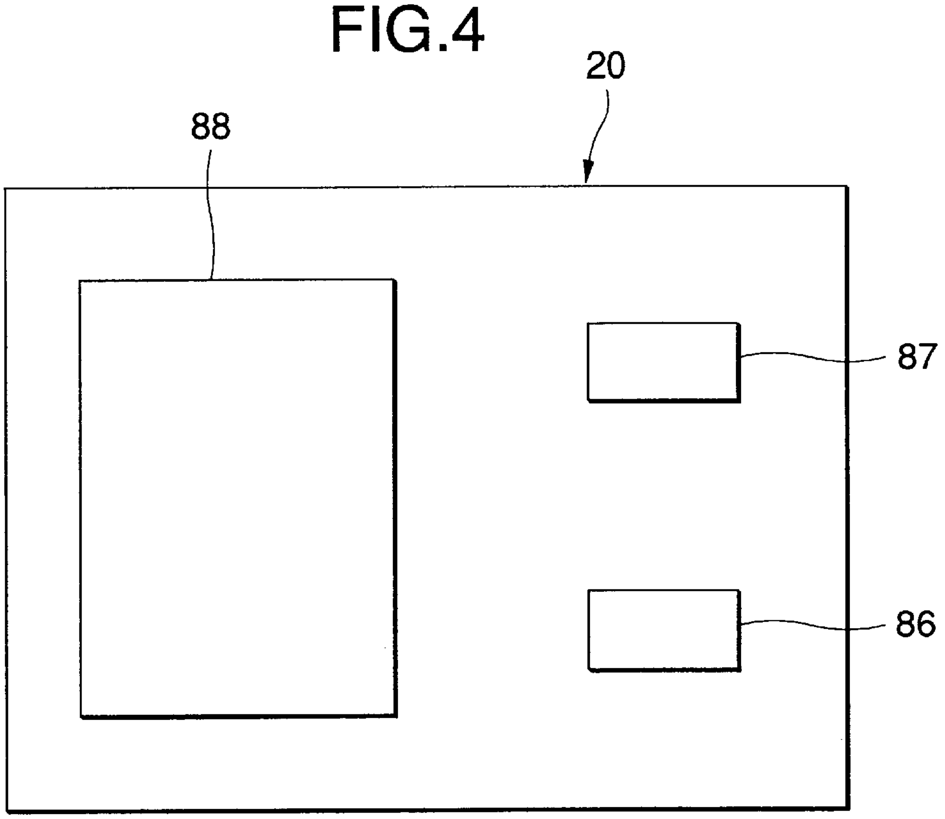
FIG. 4 is a view illustrating the operation panel.

The operation panel 20 has a power switch 86, a cleaning instruction switch 87, and a display panel 88 as shown in FIG. 4. The power switch 86 receives instructions from the user for power turning on, while the cleaning instruction switch 87 receives instructions for the execution of cleaning. This recording apparatus has such a constitution that these switches 86 and 87 output the received instructions to the main controller 11. The display panel 88 serves to display the state of the recording apparatus 10, etc. according to instructions from the main controller 11.

The main controller 11 serves to control the whole recording apparatus 10. In FIG. 5 are shown an important part of the inner constitution of the main controller 11 and an important part of the constitution for controlling the recording apparatus 10. The main controller 11 comprises a ROM 90 in which control data and control programs are stored, a RAM 91 which holds various data and image data, a processor 92, an I/F part 93 for sending or receiving control signals, image data, etc. to or from an external apparatus, and various drivers 94*a*, 94*b*, 94*c*, 94*d*, 94*e*, and 94*f* which control the actuation of individual parts.

The processor 92 implements various functions by executing a control program with reference to control data, etc., and by operating the above-described individual parts through the drivers 94*a*, 94*b*, 94*c*, 94*d*, 94*e*, and 94*f*. For example, the main controller 11 (i.e., the recording apparatus 10) has two operation modes, that is, an ordinary mode in which image recording is conducted and a cleaning mode in which the cleaning mechanism 19 is operated to conduct cleaning. The main controller has been constituted so that it not only automatically comes into the cleaning mode at a given timing or upon establishment of given conditions, but automatically returns to the ordinary mode after the execution of cleaning. In this embodiment, the main controller 11 has been constituted so that it automatically comes into the cleaning mode when (1) the cleaning instruction switch 87 is operated, (2) power is turned on by operating the power switch 86, or (3) the magazine 100 is replaced. Magazine replacement is detected based on results of the detection by the loading sensor 23 or 25. Details of the cleaning in the cleaning mode will be given later in an explanation of operations.

In this embodiment, the "latent-image forming means" in the present invention is constituted of the exposure part 15 and the main controller 11. The "heat development means" corresponds to the heat development part 16. In particular, the "heating member" corresponds to the heating drum 67. The "press contact member" corresponds to the endless belt 70. The "cleaning means" corresponds to the cleaning mechanism 19. The "circuit path" corresponds to the continuous path extending from the guide 83 to the heat development part 16 and returning to the guide 83. In the modified embodiment in which a cleaning sheet is fed from the feed part 12 and which will be described later, the "conveyance path" corresponds to the conveyance path for a recording material A which extends from the feed part 12 through the exposure part 15 to the heat development part 16 (the conveyance path for a recording material A serves also as the conveyance path for a cleaning sheet). The "storage part" corresponds to the loading parts 22 and 24 in this embodiment. The "control means" corresponds to the main controller 11. The "cleaning instruction switch" corresponds to the cleaning instruction switch 87. The "loading sensor" corresponds to the loading sensors 23 and 25.

Operations in the recording apparatus will be explained next.

A cleaning operation is explained first. The main controller 11 automatically comes into the cleaning mode when (1) the cleaning instruction switch 87 is operated, (2) power is turned on by operating the power switch 86, or (3) the magazine 100 is replaced. Simultaneously with the shift to the cleaning mode, this mode shift is displayed on the display panel 88. In the case where the cleaning instruction switch 87 is operated so as to bring the main controller 11 into the cleaning mode, the recording material A which has been fed from the feed part 12 and remains in the recording apparatus 10 is discharged before the main controller 11 comes into the cleaning mode. The loading of a magazine 100 (i.e., a fresh package 80) is detected based on results of detection by the loading sensor 23 or 25.

In the cleaning mode, the main controller 11 operates the driving roller pair 84 to thereby send a cleaning sheet 81 to the heat development part 16 from the side of the conveyance roller 76. The main controller 11 further operates the heating drum 67 and the endless belt 70 to thereby convey this cleaning sheet 81 in the same manner as an ordinary recording material A. In the course of this conveyance, the cleaning sheet 81 comes into contact with the heating drum 67 and the endless belt 70 and removes soils from the surfaces of the drum 67 and the belt 70. During this cleaning operation, the peeling claw 72 is kept apart from the heating drum 67 (in the state shown by the solid line in the Figure). Hence, the cleaning sheet 81 which has passed by the heating drum 67 returns to the conveyance path formed by the guide 83. Although the heat source 68 need not work during this operation, it may be on standby in preparation for a return to the ordinary mode.

The main controller 11 repeats the above treatment to thereby circulate the cleaning sheet 81 a given number of times. The main controller 11 then returns to the ordinary mode.

In the case where the cleaning sheet 81 used is of the type which scrapes off soils, it is necessary to slide the cleaning sheet 81 on the surface to be cleaned to thereby cause a friction therebetween. Accordingly, the peripheral speed of the heating drum 67 is purposely regulated so as to be different from the traveling speed of the endless belt 70. In this case, the heating drum 67 and the endless belt 70 may be cleaned separately in two stages. Namely, for the cleaning of the heating drum 67, the cleaning sheet 81 is conveyed by the endless belt 70 while stopping the heating drum 67 (or lowering the rotational speed thereof). For the cleaning of the endless belt 70, the cleaning sheet 81 is conveyed by the heating drum 67 while stopping the endless belt 70 (or lowering the circulation speed thereof).

An ordinary image recording operation will be explained next.

Based on image data, the main controller 11 selects the size of a recording material A to be used. The main controller 11 operates the sheet feeding means to cause the feed part 12 to feed a recording material A of the selected size. This recording material A is conveyed to the exposure part 15 by the conveying mechanism 18 including the conveying roller pair 44.

In the exposure part 15, the recording material A is irradiated with laser light modulated according to image data with scanning in the direction of primary scanning, while conveying the recording material A by the conveying means for secondary scanning 48 in the direction of secondary scanning. Thus, a latent image is formed on the conveyed recording material A, which is then sent out. The conveying roller pairs 64 and 66 convey this recording material A bearing a latent image to the heat development part 16.

The recording material A which has been conveyed to the heat development part 16 is first sandwiched between the endless belt 70 and rollers 76 and 78 and conveyed in this state to between the heating drum 67 and the endless belt 70.

The recording material A which has entered the heat development part 16 is thereafter conveyed according to the rotation of the heating drum 67 and, at the same time, developed due to the heat received from the heating drum 67 (heat development), whereby the latent image is converted to a visible image.

When the front edge of the recording material A has approached the peeling claw 72, the peeling claw 72 comes into light contact with the heating drum 67 to interpose between the heating drum 67 and the recording material A. As a result, the recording material A is peeled from the heating drum 67, and is conveyed outside the apparatus and discharged into the tray 17.

As explained above, since this embodiment of the -image recording apparatus has an advantage that the heat development part 16 (in particular, the heating drum 67 and the endless belt 70) can be cleaned, high-quality images can be recorded over a prolonged period of time.

The constitution of the heat development part should not be construed as being limited to that of the embodiment described above. For example, heat development parts respectively having the structures shown in FIGS. 6, 7, 8, and 9 are also usable.

Figure 6:
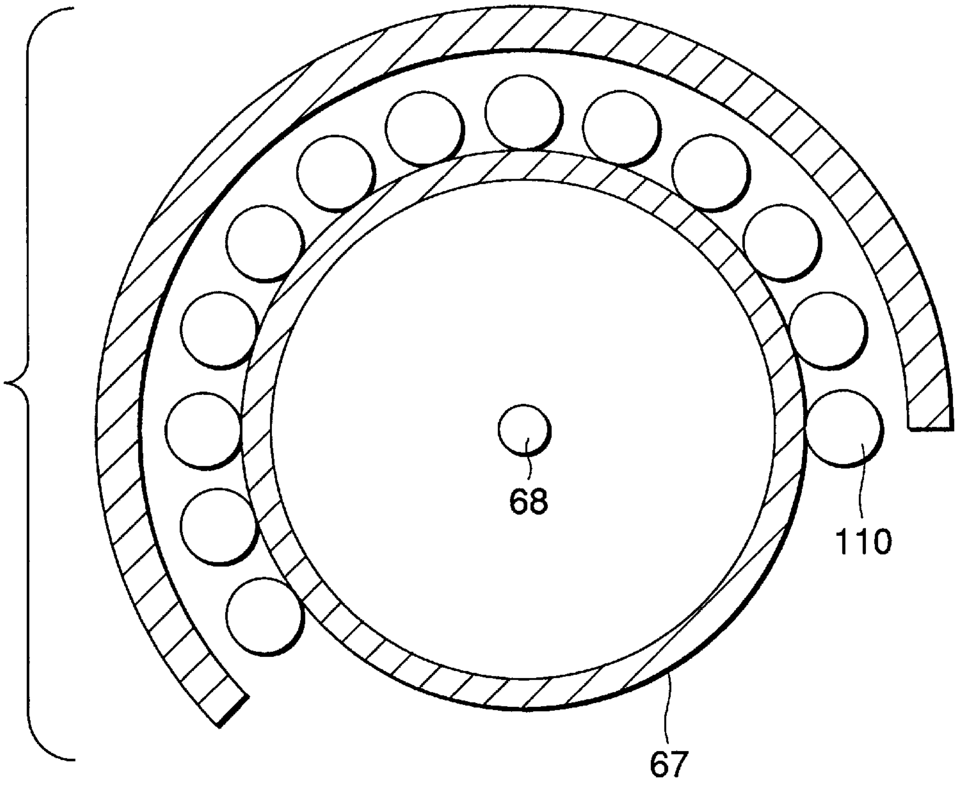
FIG. 6 is a view illustrating a heat development part having another constitution.

The example shown in FIG. 6 has a constitution comprising a heating drum 67 and rollers 110 disposed therearound so that a recording material A is pressed against the surface of the heating drum 67 by the rollers 110.

Figure 7:
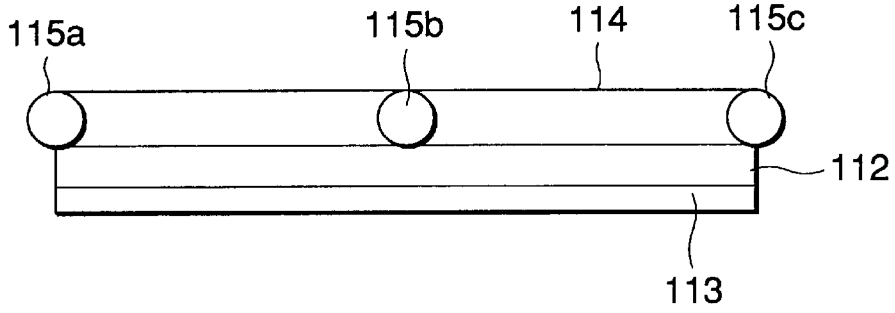
FIG. 7 is a view illustrating a heat development part having still another constitution.

The example shown in FIG. 7 employs, in place of the heating drum 67 in the embodiment described above, a flat heating plate 112 equipped with a heater 113. A recording material A is pressed against the heating plate 112 by an endless belt 114 stretched by rollers 115*a*, 115*b*, and 115*c*, and is conveyed by circulating the endless belt 114 by driving the roller 115*a*.

Figure 8:
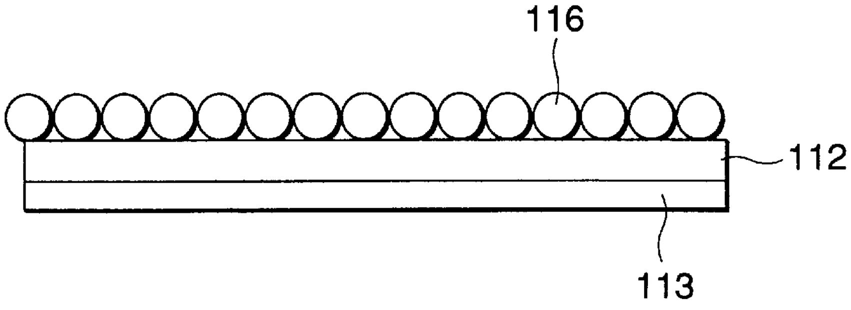
FIG. 8 is a view illustrating a heat development part having a further constitution.

The example shown in FIG. 8 comprises a flat heating plate 112 equipped with a heater 113 and has rollers 116 disposed along the heating plate 112. This example has such a constitution that a recording material A is pressed against the heating plate 112 by the rollers 116 and is conveyed by rotating the rollers 116.

Figure 9:
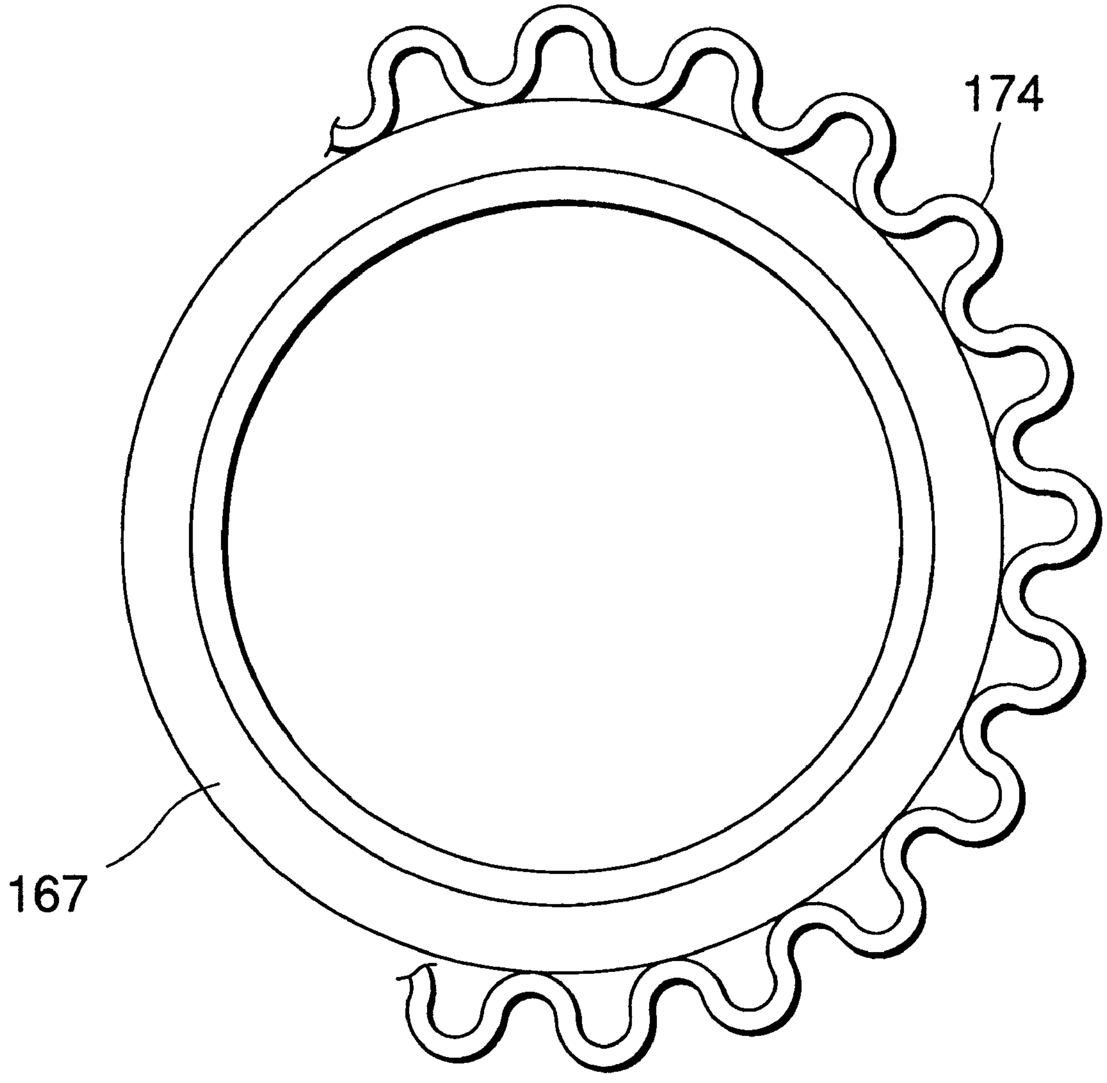
FIG. 9 is a view illustrating a heat development part having still a further constitution.

The example shown in FIG. 9 comprises a heating drum 167 equipped with a heater and has a corrugated sheet 174 disposed along the heating drum 167. This example has such a constitution that a recording material A is conveyed between the heating drum 167 and the corrugated sheet 174 by a mechanism not shown, whereby the projected parts of the corrugated sheet 174 (the parts protrudent toward the heating drum 167) press the recording material A against the heating drum 167.

The embodiment described above had a built-in cleaning sheet 81. However, constitutions for feeding a cleaning sheet 81 should not be limited thereto. Furthermore, the timing for the execution of cleaning (or the timing for a shift to the cleaning mode) also should not be limited to that in the above embodiment.

For example, one or more cleaning sheets 81 may be manually set in the loading part 22 or 24 by a maintenance technician at the time of maintenance. In this case, the maintenance technician manually operates the cleaning instruction switch 87 to thereby shift the operation mode of the recording apparatus to the cleaning mode. The number of repetitions of the execution of cleaning, which number is equal to the number of the cleaning sheets 81 which have been set, is instructed with a given switch also by the maintenance technician. In the cleaning mode, the recording apparatus feeds the instructed number of cleaning sheets 81 set in the loading part 22 or 24 to thereby conduct cleaning.

Another possible method is to store beforehand a predetermined number of cleaning sheets 81 in a package in which a recording material A has been stored. For example, cleaning sheets 81 are disposed on top of the recording material A so that the cleaning sheets 81 are fed before the recording material A. In this case, the recording apparatus automatically comes into the cleaning mode upon the setting of a fresh magazine 100 and then automatically feeds the cleaning sheets 81 by means of the conveying mechanism 18, etc. to thereby conduct cleaning. After completion of the cleaning by feeding the cleaning sheets 81, the recording apparatus automatically returns to the ordinary mode. This cleaning method enables cleaning to be conducted always at a regular interval, without requiring the user to perform any operation for cleaning. Cleaning sheets 81 may be disposed beneath the lowermost sheet of the recording material in a package. It is also possible to dispose cleaning sheets 81 within a set of recording material sheets at an interval of a given number of sheets.

The cleaning mechanism may consist only of the holding/circulating mechanism 82 described hereinabove so that a cleaning sheet 81 is set by the user on the feed part 12. In this case, the cleaning sheet 81 is conveyed from the feed part 12 to the heat development part 16 by the conveying mechanism 18, etc. at the time of the initiation of cleaning. Cleaning is then conducted two or more times while circulating the cleaning sheet 81 by means of the holding/circulating mechanism 82. The cleaning sheet 81 is finally discharged into the tray 17 by bringing the peeling claw 72 into contact with the heating drum 67.

It is a matter of course that whichever one is selected among the constitutions described above, the exposure part 15 in the cleaning mode does not operate for image recording.

In still a further possible cleaning method, the number of sheets used for image recording, the time used for image recording, etc. are counted or measured, and cleaning is automatically conducted every time when a given number of sheets have been used or a given period of time has passed.

Next, the heat development apparatus of embodiment 2 according to the present invention will be explained below in detail by reference to the embodiment thereof shown in the accompanying drawings.

Figure 10:
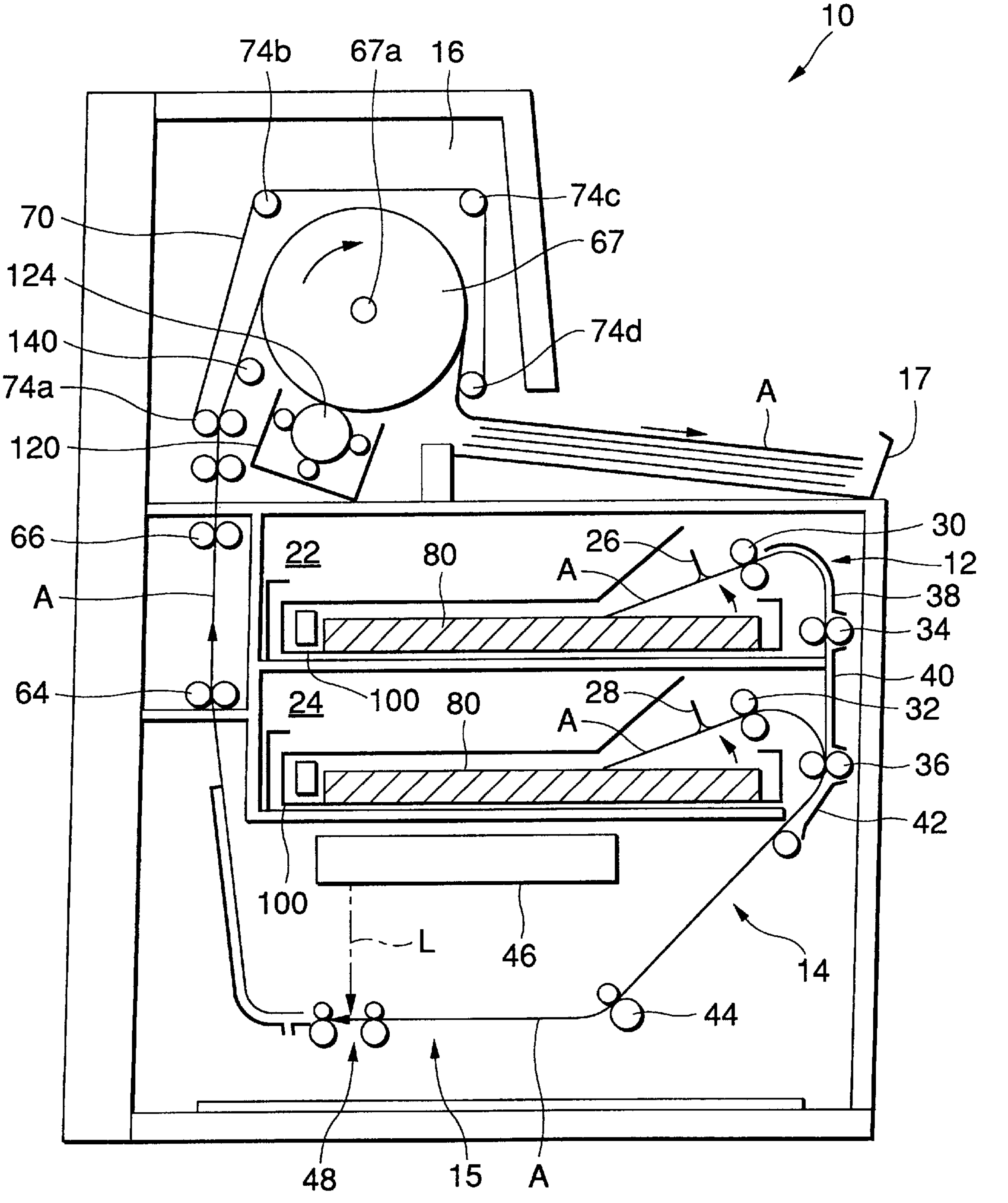
FIG. 10 is a diagrammatic view illustrating a heat development apparatus as a second embodiment of the present invention.

FIG. 10 is a diagrammatic view illustrating the constitution of a heat development apparatus of embodiment 2 according to the present invention. As shown in the figure, this heat development apparatus 10 comprises as main constituent elements a recording material feed part 12, a sideway register part 14, an image-wise exposure part 15, and a heat development part 16 which are disposed in this order along the conveyance path for a heat development photosensitive material or light- and heat-sensitive recording material (hereinafter referred to as "recording material A").

The recording material feed part 12 is a part which takes up, one by one, sheets of a recording material A and feeds the same to the sideway register part 14, located downstream in the conveyance direction for the recording material A. This feed part 12 comprises loading parts 22 and 24, recording material feeding means having suckers 26 and 28 disposed respectively at the loading parts, feed roller pairs 30 and 32, conveying roller pairs 34 and 36, and conveyance guides 38, 40, and 42.

The loading parts 22 and 24 each is a part in which a magazine 100 containing a recording material A is loaded in a given position. The embodiment shown in the figure has two loading parts 22 and 24. In general, magazines 100 containing recording materials A of different sizes (e.g., a recording material A of half size for CT or MRI and a recording material A of B4 size for FCR (Fuji Computed Radiography)) are loaded in the two loading parts, respectively.

The recording material feeding means disposed in each of the loading parts 22 and 24 holds a recording material A with the sucker 26 or 28 by suction and conveys the recording material A by transferring the sucker 26 or 28 by a known transfer means, e.g., a linkage, to thereby feed the recording material A to the feed roller pair 30 or 32 disposed respectively in the loading part 22 or 24.

Examples of the recording material A include the above-described heat development recording material and light- and heat-sensitive recording material.

The recording material A is in the form of sheets. In general, the recording material A is stored as a package 80 comprising a given number, e.g., 100, of sheets of the recording material A as a unit stack (bundle) packaged with a bag, band, etc.

The heat development photosensitive material and the light- and heat-sensitive recording material will be explained later in detail.

The recording material A which has been fed from the loading part 22 to the feed roller pair 30 is conveyed to the downstream sideway register part 14 by the conveying roller pairs 34 and 36 while being guided by the conveyance guides 38, 40, and 42. On the other hand, the recording material A which has been fed from the loading part 24 to the feed roller pair 32 is conveyed to the downstream sideway register part 14 by the conveying roller pair 36 while being guided by the conveyance guides 40 and 42.

The sideway register part 14 is a part in which a recording material A is positioned with respect to the direction perpendicular to the direction of conveyance (hereinafter that direction for positioning is referred to as "width direction") to thereby position the recording material A with respect to the direction of primary scanning in the downstream image-wise exposure part 15, i.e., to conduct the so-called side resist, and is then conveyed to the downstream image-wise exposure part 15 with the conveying roller pair 44.

Methods for the side resist in the sideway register part 14 are not particularly limited, and various known methods can be used. Examples thereof include: a method in which a resist plate which comes into contact with one width-direction edge of a recording material A to conduct positioning is used in combination with a pushing means, e.g., a roller, for pushing the recording material A in the width direction to bring that edge thereof into contact with the resist plate; and a method in which a guide plate or the like which is movable according to the width-direction size of a recording material A is used, in combination with the resist plate, so as to restrict the width of the conveyance path for the recording material A to thereby likewise bring the recording material A into contact with the resist plate.

The recording material A which has been conveyed to the sideway register part 14 is positioned with respect to the direction perpendicular to the direction of conveyance as described above, and is then conveyed to the downstream image-wise exposure part 15 by the conveying roller pair 44.

The image-wise exposure part 15 is a part in which the recording material A is image-wise exposed by means of light beam scanning. This exposure part 15 comprises an exposure unit 46 and a conveying means for secondary scanning 48.

As shown in FIG. 2, the exposure unit 46 is a known light beam scanner in which a light beam L modulated according to an image to be recorded is deflected in the direction of primary scanning (the direction of the width of the recording material A) and caused to strike on a given recording position X. This exposure unit 46 comprises a light source 50 which emits a light beam L having a narrow wavelength region according to the spectral sensitivity of t he recording material A, a recording controller 52 which actuates the light source 50, a polygon mirror 54 as a light deflector, an fθ lens 56, and a down mirror 58.

Besides these components, other various members for use in known light beam scanners may have been disposed in the exposure unit 46 according to need. Examples of such other members include a collimator lens and a beam expander both for shaping the light beam L emitted from the light source, an optical system for correcting plane inclination, and a mirror for light path regulation.

The recording controller 52 operates the light source 50 so as to conduct pulse duration modulation according to an image to be recorded to thereby cause the light source 50 to emit a light beam L which has undergone pulse duration modulation according to the image to be recorded.

The light beam L emitted from the light source 50 is deflected with the polygon mirror 54 in the direction of primary scanning, modulated with the fθ lens 56 so as to form an image at the recording position X, and then deflected with the down mirror 58 so as to strike on the recording position X.

The embodiment shown in the figures is an apparatus for monochromic image recording, and the exposure unit 46 hence has only one light source 50. However, for use in the recording of a color image, the apparatus employs an exposure unit which, for example, has three light sources respectively emitting light beams of different wavelengths corresponding to the R (red), G (green), and B (blue) spectral sensitivities of color photosensitive materials.

On the other hand, the conveying means for secondary scanning 48 has two conveying roller pairs 60 and 62 disposed respectively on both sides of the recording position X (scanning line). This conveying means 48 conveys a recording material A, by means of the conveying roller pairs 60 and 62, in the direction of secondary scanning (the direction indicated by "a" in FIG. 2) which is perpendicular to the direction of primary scanning, while holding the recording material A in the recording position X.

As stated above, the light beam L used here for exposure, which has undergone pulse duration modulation according to an image to be recorded, is being deflected in the direction of primary scanning. Consequently, the recording material A is two-dimensionally exposed by means of scanning with the light beam, whereby a latent image is recorded.

Although the embodiment shown in the figures has a constitution in which the light source 50 is directly modulated to conduct pulse duration modulation, the present invention is also applicable to an apparatus in which pulse number modulation is conducted. This invention is further applicable to an apparatus in which pulse modulation is indirectly conducted with an external modulator such as, e.g., an AOM (acoustooptical modulator).

Furthermore, the recording apparatus may have a constitution in which analog intensity modulation is conducted for image recording.

The recording material A conveyed to the image-wise exposure part 15 is exposed to a scanning light beam, e.g., laser light, to form a latent image on the recording material A. Thereafter, the recording material A is conveyed to the heat development part 16 by conveying rollers 64 and 66, etc. During this conveyance, dust particles are removed from the front and back sides of the recording material A with dust removing rollers 136.

The heat development part 16 is a part in which the recording material A is heated to conduct heat development to thereby convert the latent image into a visible image. It basically consists of a heating drum 67 and an endless belt 70.

The heating drum 67 contains a built-in heating means such as a light source for heating, e.g., a halogen lamp, or a heat source, e.g., a heater, so that the surface thereof is heated to and kept at a temperature corresponding to the heat development temperature of the recording material A. The heating drum 67 rotates on a shaft 67*a*. This drum 67 and the endless belt 70 in cooperation transfer the recording material A while sandwiching the same therebetween. During this conveyance, the recording material A is thermally developed by contact with the heating drum 67.

The endless belt 70 is made of a heat-resistant material such as a metal, e.g., iron, copper, or stainless steel, a polycarbonate film, a fluoroethylene resin film, a silicone rubber, a composite fluororesin film, etc. This endless belt 70 is stretched by four rollers, i.e., rollers 74*a*, 74*b*, 74*c*, and 74*d*, and is pressed against the heating drum 67 in such a manner as to wind around the drum 67.

The present invention is characterized in that this heat development part 16 has a dust removing means 120 which is in contact with the heating drum 67.

Figure 11:
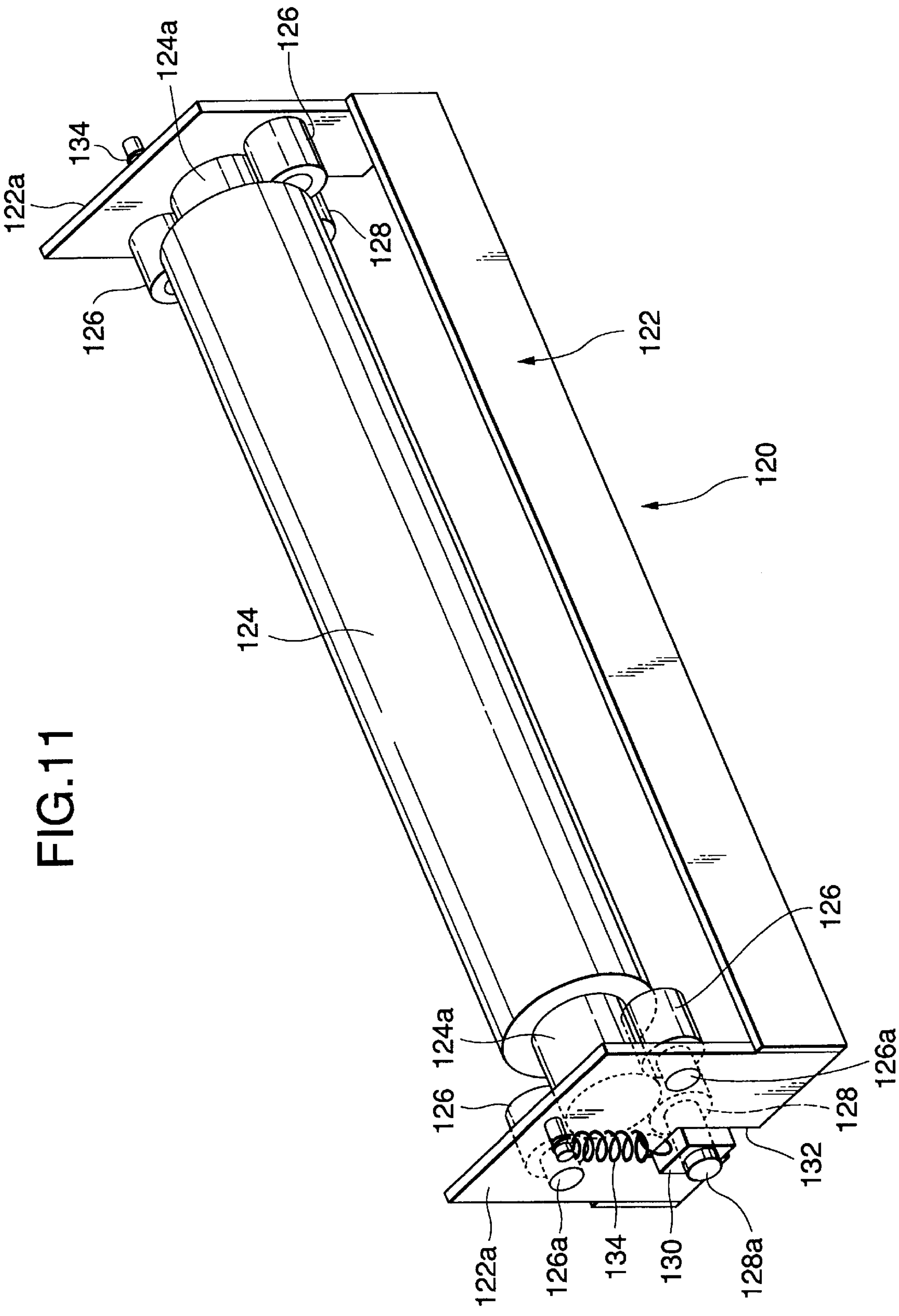
FIG. 11 is a diagrammatic view illustrating the dust removing means of the heat development apparatus shown in FIG. 10.
Figure 12:
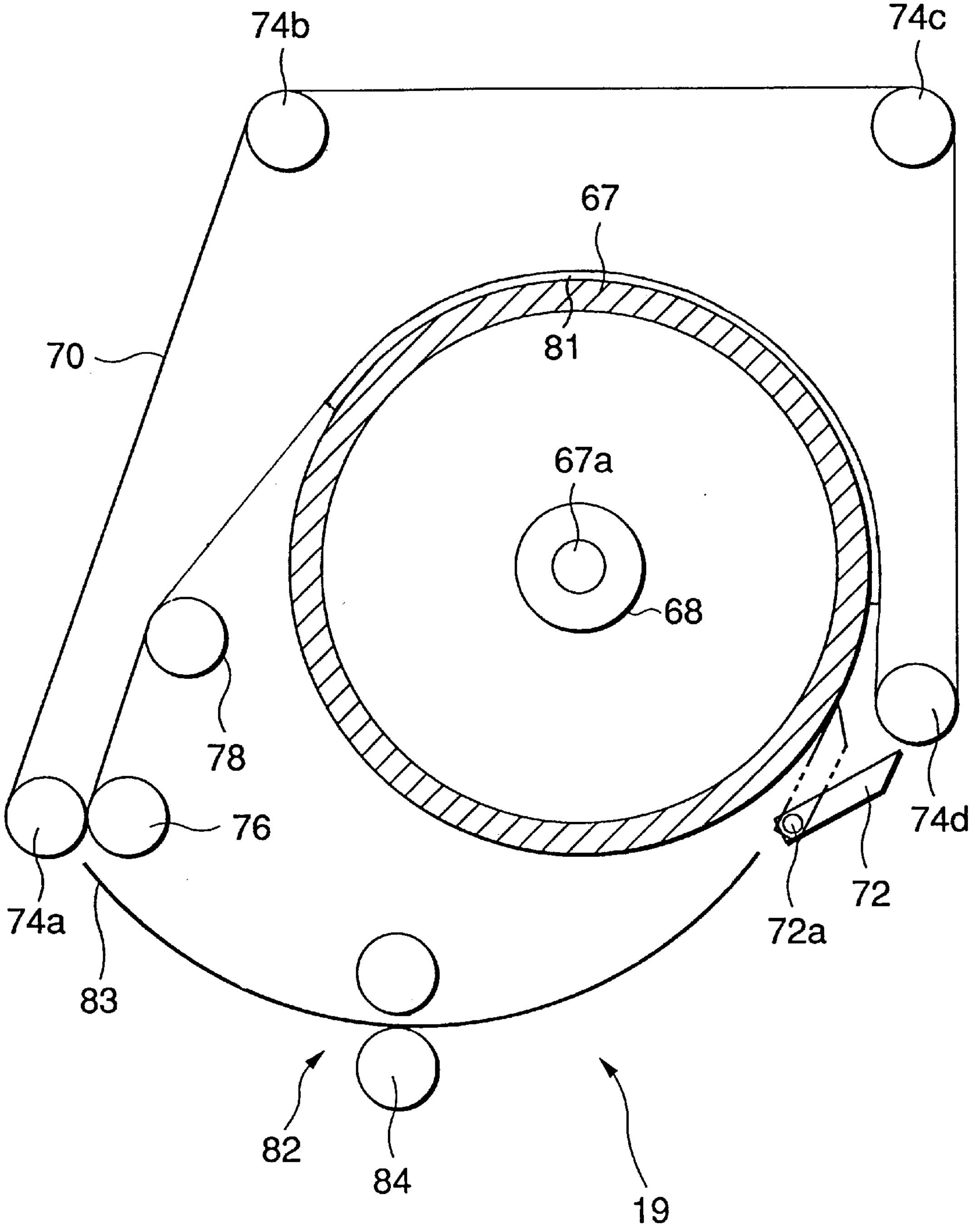
FIG. 12 is a view illustrating the constitutions of the heat development part and the cleaning mechanism, and further depicting the cleaning mechanism in the cleaning mode where the cleaning sheet (81) is actually between the heating drum and the endless belt.

This dust removing means 120 serves to remove dust particles adherent to the surface of the heating drum 67. As shown in FIG. 11, the dust removing means 120 comprises a casing 122 having side walls 122*a* and, disposed between the side walls 122*a*, a dust removing roller 124 whose peripheral surface has tackiness, supporting rollers 126 disposed so as to sandwich the dust removing roller 124 therebetween, and press rollers 128 for pressing the dust removing roller 124 against the heating drum 67.

As the roller having tackiness can be used a tacky roller made of a butyl rubber, a tacky roller made of a silicone rubber, or the like.

Each supporting roller 126 has its shaft 126*a*, which is supported at only one end on the corresponding side wall 122*a* in a freely rotatable manner. The press rollers 128 have been fixed respectively to both ends of a shaft 128*a*, whose both ends are supported respectively on bearing blocks 130. Each bearing block 130 has been fitted, in a freely vertically movable manner, to a groove 132 formed in the side wall 122*a*, and an upward force is kept being applied thereto with a spring 134.

The shaft 124*a* of the dust removing roller 124 is placed between the supporting rollers 126, whereby the dust removing roller 124 sits on the press rollers 128.

The casing 122 containing a unit of such integrated rollers is fitted into the recording apparatus 10. As shown in FIG. 10, the dust removing roller 124 is always pressed against the heating drum 67 with the press rollers 128 by means of the force of the springs 134.

When the heating drum 67 rotates, the dust removing roller 124 is rotated by the drum 67, whereby dust particles present on the peripheral surface of the heating drum 67 are adhered to the roller 124 and are thus removed. During this dust removal operation, the two sets of supporting rollers 126 are rotated by the rotating dust removing roller 124 so as to sandwich the dust removing roller 124 therebetween to thereby keep the dust removing roller 124 in its right position, while the press rollers 128 press the dust removing roller 124 against the heating drum 67 while being rotated by the dust removing roller 124.

In the case where the dust removing roller 124 in this dust removing means 120 is replaced, this replacement is accomplished by merely taking the dust removing roller 124 out of the space formed by the two sets of supporting rollers 126 and the pressing rollers 128 and placing a fresh dust removing roller 124 in the space. Thus, the operation for replacing the dust removing roller 124 is easy.

The structure of the dust removing roller 124 in the dust removing means 120 is not limited to that described above, and the roller 124 can have any of various structures. For example, a sheet coated with a pressure-sensitive adhesive may be applied to the peripheral surface of the dust removing roller 124.

A dust removing roller 140 is further disposed on the endless belt 70 in a position upstream from the heating drum 67 to thereby clean that side of the endless belt 70 which pushes the recording material A. As a result, dust removal from the heating drum 67 becomes more effective.

The recording material A which has undergone heat development in the heating part 16 is collected in a tray 79.

The recording materials A are illustrated below in more detail.

A heat-developable photosensitive material (hereinafter referred to as "a first recording material") has on one side of a support an image forming layer which comprise an organic silver salt, a reducing agent therefor and binders at least 50 wt % of which is a latex.

When the first recording material is exposed to light, a photocatalyst present therein, such as light-sensitive silver halide, forms latent image speck. The application of heat thereto enables the silver of ionized organic silver salt to diffuse, and thereby the ionized silver can combine with the latent image speck to be converted to crystallized silver by the action of the reducing agent; as a result, an image is formed.

The organic silver salt contained in the image forming layer of the first recording material is relatively stable to light, but can form a silver image when it is heated up to 80° C. or higher in the presence of an exposed photocatalyst (a latent image formed from light-sensitive silver halide) and a reducing agent. Such an organic silver salt may be in a desalted condition, if desired.

As examples of such an organic silver salt, mention may be made of the silver salts of organic acids, especially the silver salts of long-chain aliphatic carboxylic acids containing 10 to 30 carbon atoms, and the complexes of organic or inorganic silver salts whose ligands have complexation stability constants ranging from 4.0 to 10.0. More specifically, those organic silver salts include silver behenate, silver arachidate, silver stearate, silver oleate, silver laurate, silver caproate, silver myristate, silver palmitate, silver maleate, silver fumarate, silver tartarate, silver linolate, silver butyrate, silver camphorate and so on.

Also, the silver salts of mercapto or thione group-containing compounds and derivatives thereof can be favorably used as the organic silver salts. Examples thereof include the silver salt of 3-mercapto-4-phenyl-1,2,4-triazole, the silver salt of 2-mercaptobenzimidazole, the silver salt of 2-mercapto-5-aminothiadiazole, the silver salts of thioglycolic acids, such as silver S-alkylthioglycolates, the silver salts of dithiocarboxylic acids, such as silver dithioacetate, the silver salts of thioamides, the silver salt of 5-carboxy-1-methyl-2-phenyl-4-thiopyridine, the silver salt of mercaptotriazine and the silver salt of 2-mercaptobenzoxazole.

It is desirable for such organic silver salts to be needle crystals having a minor axis and a major axis. Preferably, the minor axis is from 0.01 to 0.20 $\mu$m, and the major axis is from 0.10 to 5.0 $\mu$m.

The size distribution among organic silver salt grains is preferably monodisperse. The term Iumonodisperseul used herein means that, in the measurement of minor axis length and major axis length each, the standard deviation divided by the mean of measured values is 100% or less, expressed in percentage.

For the purpose of obtaining such an organic silver salt in the form of fine grains free from aggregation, it is desirable to prepare a solid fine-grain dispersion using a known dispersing agent, such as polyacrylic acid, polyvinyl alcohol or polyvinyl pyrrolidone.

The solid fine-grain dispersion of an organic silver salt can be prepared according to a known mechanical dispersion method of using a ball mill, a vibration mill or the like in the presence of a dispersing agent.

Besides the mechanical dispersion method, it is also possible to adopt a method in which coarse grains of an organic solvent are first dispersed in an solvent by pH control and then converted to fine grains by pH change in the presence of a dispersing aid.

The appropriate concentration of an organic silver salt is from 0.1 to 5 g/l, preferably from 1 to 3 g/l, based on silver.

The reducing agent for organic silver salts can be any of materials capable of reducing silver ion to metallic silver, preferably organic substances. Specifically, the reducing agents known to be used for recording materials utilizing organic silver salts, such as those described by JP-A-57-82829, JP-A-6-3793 (the term "JP-A" as used herein means an "unexamined published Japanese patent application") and U.S. Pat. No. 5,464,738, can be used in the present invention also.

Examples of such a reducing agent include amidoximes, such as phenylamidoxime; azines, such as 4-hydroxy-3,5-dimethoxybenzaldehyde azine; hydroxamic acids, such as phenylhydroxamic acid; a-cyanophenylacetic acid derivatives, such as ethyl-α-cyano-2-methylphenylacetate; bis-β-naphthols, such as 2,2'-dihydroxy-1,1'-binaphthyl; 5-pyrazolones, such as 3-methyl-1-phenyl-5-pyrazolone; reductones, such as dimethylaminohexose reductone; sulfonamidophenol reducers, such as 2,6-dichloro-4-benzenesulfonamidophenol; chromans, such as 2,2-dimethyl-7-t-butyl-6-hydroxychroman; 1,4-dihydropyridines, such as 2,6-dimethoxy-3,5-dicarboethoxy-1,4-dihydropyridine; bisphenols, such as bis (2-hydroxy-3-t-butyl-5-methylphenyl)methane, 2,2-bis(4-hydroxy-3-methylphenyl)propane, 4,4-ethylidene-bis(2-t-butyl-6-methylphenol), 1,1-bis(2-hydroxy-3,5-dimethylphenyl)-3,5,5-trimethyihexane and 2,2-bis(3,5-dimethyl-4-hydroxyphenyl)propane; ascorbic acid derivatives, such as 1-ascorbyl palmitate; and chromanols (tocopherol, etc.). In particular, bisphenols and chromanols are preferred over the others.

In addition to the above-recited ones, conventional photographic developing agents, such as phenidone, hydroquinone and catechol, can be also used to advantage. In particular, hindered phenol reducers are preferable.

Such reducing agents may be added in a state of solution, powder or solid fine-grain dispersion. Additionally, the solid fine-grain dispersion is prepared using a known means of fine grinding (e.g., a ball mill, a vibration ball mill), optionally in the presence of a dispersing aid.

The suitable amount of a reducing agent used is from about 5 mole % to about 50 mole % per mole of silver on the side of the image forming layer. The reducing agent is basically added to the image forming layer, but may be added to another layer on the same side as the image forming layer. In this case, it is desirable to use the reducing agent in an amount greater than the foregoing amount, specifically an amount ranging from 10 to 50 mole % per mole of silver. Further, the reducing agent may be the so-called precursor, or a compound derived therefrom so as to function effectively at the time of development alone.

In the image forming layer of the first recording material, a substance which is converted to a photocatalyst by exposure to light, e.g., light-sensitive silver halide (hereinafter abbreviated as "silver halide") is contained.

The silver halide used in the first recording material has no particular restriction on halide composition, so that it may be any of silver chloride, silver chlorobromide, silver bromide, silver iodobromide, silver iodochlorobromide and silver iodide. However, silver bromide or silver iodobromide can be used to advantage.

It is desirable for the silver halide to have a grain size of 0.20 μm or smaller from the viewpoint of preventing the recording material from becoming clouded after the image formation. In particular, the silver halide having a cubic or tabular grain shape is preferred.

Further, it is desirable for the silver halide grains to contain at least one metal complex selected from the group consisting of rhodium complexes, rhenium complexes, ruthenium complexes, osmium complexes, iridium complexes, cobalt complexes, mercury complexes and iron complexes in an amount of from about 1 nmole to about 10 mmole per mole of silver. Those complexes are described in detail in JP-A-7-22549.

Additionally, the metal complexes as mentioned above may be incorporated uniformly in each silver halide grain or in a higher concentration in the core or shell part of each silver halide grain. There is no particular restriction on the way of incorporating those metal complex, though.

Furthermore, it is desirable that the silver halide grains used in the recording material be chemically sensitized.

In chemically sensitizing the silver halide grains, any of known methods may be used. Examples of a usable method include a sulfur sensitization method, a selenium sensitization method and a tellurium sensitization method using diacyl tellurides, bis(oxycarbonyl)telluride or so on, a precious metal sensitization method using chloroauric acid, potassium chloroaurate or so on, and a reduction sensitization method using ascorbic acid, thiourea dioxide or so on.

Also, it is possible to adopt a method of ripening silver halide grains as the emulsion thereof is maintained at pH 7 or above or pAg 8.3 or below, or the sensitization method utilizing the reduction by introducing the period of single addition of silver ion into the process of grain formation.

It is desirable that the thus sensitized silver halide grains be used in an amount of 0.01 to 0.5 mole per mole of organic silver salt.

In cases where silver halide and an organic silver salt are prepared separately, these constituents can be mixed in various manners and under various conditions. For instance, after their separate preparations are concluded, the silver halide grains and the organic silver salt may be mixed using a high-speed stirrer, a ball mill, a sand mill, a colloid mill, a vibration mill, a homogenizer or the like. Another manner may be adopted, wherein after preparation of silver halide grains the organic silver salt under preparation are admixed with these silver halide grains at a right moment and then the preparation thereof is brought to completion.

As still another example of a suitable method for preparing silver halide grains and mixing them with an organic silver salt, mention may be made of the so-called halidation method, or the method of partially halogenating the silver of an organic silver salt by the use of an organic or inorganic halide. Examples of an organic halide usable therein include N-halogenoimides, such as N-bromosuccinimide, and halogenated quaternary nitrogen compounds, such as brominated tetrabutylammonium. Examples of an inorganic halide usable therein include alkali metal halides, such as lithium bromine and potassium iodide, ammonium halides, such as ammonium bromide, alkaline earth metal halides, such as calcium bromide, and halogen molecules, such as bromine and iodine. The suitable amount of a halide added in halidation is from 1 to 500 mmol per mol of organic silver salt.

The image forming layer of the first recording material, in which the constituents as recited above are incorporated, further contains binders, at least 50 wt % of which is a latex having fine particles of a water-insoluble hydrophobic polymer dispersed in a water-soluble dispersing medium. Further, another layer may have such a binder composition, if needed.

With respect to the dispersed condition of such a latex, the latex may be in various conditions, such as a condition created by emulsifying a polymer in a dispersing medium, a condition created using an emulsion polymerization method or a micelle dispersion method, and a condition of molecular dispersion which polymer molecules themselves assume when they have a hydrophilic partial structure. Further, the latex may have a general uniform structure or the so-called core/shell structure.

For details of such latexes, Synthetic Resin Emulsions, compiled by Taira Okuda and Hiroshi Inagaki, published by Kobunshi Kankokai in 1978, Applications of Synthetic Latexes, compiled by Takaaki Sugimura, Yasuo Kataoka, Soichi Suzuki and KeijiKasahara, published by Kobunshi Kankokai in 1993, Chemistry of Synthetic Latexes, written by Soichi Muroi, published by Kobunshi Kankokai in 1970, and so on can be referred to.

Examples of a polymer comprised in such a latex include an acrylic resin, a vinyl acetate resin, a polyester resin, a polyurethane resin, a rubber resin, a vinyl chloride resin, a vinylidene chloride resin and a polyolefin resin.

Such polymers may be straight-chain, branched-chain or cross-linked polymers. Further, they may be polymers obtained by polymerizing only one kind of monomer, namely the so-called homopolymers, or copolymers obtained by polymerizing two or more kinds of monomers. These copolymers may be random copolymers or block copolymers.

It is desirable that the number-average molecular weight of those polymers be of the order of 5,000–1,000,000, preferably the order of 10,000–100,000. When the molecular weight of a polymer used is too low, the light-sensitive layer using such a polymer has insufficient mechanical strength; while, when the polymer has too high molecular weight, it cannot provide excellent firm formability.

Examples of a usable copolymer include a copolymer of methyl methacrylate, ethyl methacrylate and methacrylic acid, a copolymer of methyl methacrylate, 2-ethylhexyl acrylate, styrene and acrylic acid, a copolymer of styrene, butadiene and acrylic acid, a copolymer of styrene, butadiene, divinylbenzene and methacrylic acid, a copolymer of methyl methacrylate, vinyl chloride and acrylic acid, and a copolymer of vinylidene chloride, ethyl acrylate, acrylonitrile and methacrylic acid.

In addition, various kinds of commercially produced polymers can also be employed. Examples of such products include an acrylic resin, Cevian A-4635 (produced by Daicel Chemical Industries, Ltd.), a polyester resin, FINETEX ES650 (produced by Dai-Nippon Ink & Chemicals, Inc.), a polyurethane resin, HYDRAN AP10 (produced by Dai-Nippon Ink & Chemicals, Inc.), a rubber resin, LACSTAR 7310K (produced by Dai-Nippon Ink & Chemicals, Inc.), a vinyl chloride resin, G351 (produced by Nippon Zeon Co., Ltd.), a vinylidene chloride resin, L502 (produced by Asahi Chemical Industry Co., Ltd.), and a polyolefin resin, Chemipearl S120 (produced by Mitsui Petrochemical Industries, Ltd.).

Those polymers may be used alone, or a blend of at least two of those polymers may be used, if desired.

The suitable average diameter of particles dispersed in a latex is from 1 to 50,000 nm, preferably from 5 to 1,000 nm. The dispersed particles have no particular restriction as to the distribution of particle diameters. Namely, both a latex having a broad distribution of particle diameters and a latex having a monodisperse diameter distribution may be used.

It is desirable for the latex used to have its minimum filming temperature (MFT) in the range of −30° C. to 90° C., preferably 0° C. to 70° C.

In the image forming layer of the first recording material, as mentioned above, at least 50 wt % of the total binders is a latex. In particular, it is preferred that at least 70 wt % of the total binders be a latex.

To the image forming layer, if desired, hydrophilic polymers, such as gelatin, polyvinyl alcohol, methyl cellulose, hydroxypropyl cellulose, carboxymethyl cellulose and hydroxypropylmethyl cellulose, may also be added as far as the proportion thereof is not more than 50 wt % to the total binders. Preferably, the amount of hydrophilic polymers added is not more than 30 wt % to the total binders in the image forming layer.

Further, it is desirable that the dispersed particles (polymer particles) of the latex have an equilibrium water content of at most 2 wt %, preferably at most 1 wt %, under the condition of 25° C. and 60% RH.

In the image forming layer of the first recording material and another layer arranged on the same side of the image forming layer, an additive known to be a color toning agent can be contained, desirably in a proportion of about 0.1 to about 50 mole % per mole of silver, for the purpose of improving the optical density. Additionally, such a color toning agent may be a precursor derived therefrom so as to function effectively at the time of development alone.

Various toning agents known to be useful for recording materials can be employed in this recording material: with examples including phthalimide compounds, such as phthalimide and N-hydroxyphthalimide; cyclic imides, such as succinimide and pyrazoline-5-one; naphthalimides, such as N-hydroxy-1,8-naphthalimide; cobalt complexes, such as cobalthexamine trifluoroacetate; mercaptanes, such as 3-mercapto-1,2,4-triazole and 2,4-dimercaptopyrimidine; and phthalazinone derivatives such as 4-(1-naphthyl) phthalazinone and metal salts thereof. Such a toning agent is added to a coating solution in a state of solution, powder or solid fine-grain dispersion.

The recording material having the image forming layer as mentioned above may contain a sensitizing dye, if needed, in the image forming layer and/or another layer, desirably in an amount of the order of $10^{-6}$ to 1 mole per mole of silver halide in the image forming layer.

As far as they can adsorb to silver halide grains and spectrally sensitize them in the desired wavelength region, any dyes can be used as sensitizing dyes. Examples thereof include cyanine dyes, merocyanine dyes, complex cyanine dyes, complex merocyanine dyes, holopolar cyanine dyes, styryl dyes, hemicyanine dyes, oxonol dyes and hemioxonol dyes. In the present invention, sensitizing dyes having spectral sensitivities suitable for the spectral characteristics of recording light L are selected from those dyes.

In adding such sensitizing dyes to a silver halide emulsion, they may be dispersed directly to the emulsion, or they may first be dissolved in a single or mixed solvent, such as water, methanol, ethanol, N,N-dimethylformamide or a mixture of two or more thereof, and then added to the emulsion.

The first recording material may contain in the image recording layer and/or another layer an antifoggant, a stabilizer and a precursor of stabilizer with the intention of preventing additional fog and a sensitivity drop upon storage.

Examples of an antifoggant, a stabilizer and a precursor of stabilizer which can be used include the thiazonium salts described in U.S. Pat. No. 2,131,038, the azaindenes described in U.S. Pat. No. 2,886,437, the mercury salts described in U.S. Pat. No. 2,728,663, and the urazoles described in U.S. Pat. No. 3,287,135. Further, the organic halides described in JP-A-50-119624 and JP-A-8-15809 can be favorably used as antifoggants.

These antifoggants and so on may be added to a coating solution in a state of solution, powder or solid fine-grain dispersion.

In the image recording layer and/or another layer, this recording material may contain benzoic acid compounds for the purpose of increasing the sensitivity and preventing fog.

Although various benzoic acid derivatives can be used for the foregoing purpose, the compounds described in U.S. Pat. No. 4,787,939 and JP-A-9-329865 are used to greater advantage. They are added to a coating solution in a state of powder, solution or fine-grain dispersion.

The addition amount of those benzoic acid compounds may be optional, but the appropriate amount is of the order of 1 μmole to 2 mole per mole of silver.

For the purposes of retarding or accelerating the development, heightening the spectral sensitizing efficiency, enhancing the storage property before and after the development and so on, a mercapto, disulfide or thione compound can be incorporated in the image recording layer and/or another layer of the first recording material.

The mercapto compound used, though it may have any structure, is preferably a compound represented by formula Ar—SM or Ar—S—S—Ar, wherein M is a hydrogen atom or an alkali metal atom and Ar is an aromatic single or condensed ring containing at least one nitrogen, sulfur, oxygen, selenium or tellurium atom. Examples of such a mercapto compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 4,5-diphenyl-2-imidazolethiol and 2-mercaptoimidazole.

The amount of mercapto compound added is desirably of the order of 0.001–1.0 mole per mole of silver.

With the intention of improving tone and preventing irradiation, the first recording material may contain various dyes and pigments in the image recording layer and/or another layer.

Any of dyes and pigments, e.g., those set forth in Color Index, will suffice for the foregoing purpose. Specifically, pyrazoloazole dyes, anthraquinone dyes, azo dyes, azomethine dyes, oxonol dyes, carbocyanine dyes, styryl dyes, triphenylmethane dyes, indoaniline dyes, indophenol dyes, organic pigments such as phthalocyanine, and inorganic pigments are usable, and they are added to a coating solution in a state of solution, emulsion or solid fine-grain dispersion, or after they are mordanted by a polymeric mordant.

The amount of dyes used is chosen depending on the desired absorption rate, but it is generally of the order of 1 μg to 1 g per liter.

In addition to the above-recited constituents, the recording material may contain in the image recording layer and/or another layer a plasticizer and a lubricant (e.g., glycerines and diols as described in U.S. Pat. No. 2,960,404), a superhigh-contrast agent (e.g., the hydrazine derivatives described in JP-A-9-304872), a high contrast accelerator (e.g., the onium salts described in JP-A-9-297368) and a hardener (e.g., the polyisocyanates described in JP-A-6-208193).

In addition to the image forming layer, this recording material may have various layers.

For instance, a surface protective layer may be formed with the intention of protecting the image forming layer and preventing adhesion. In forming the surface protective layer, an adhesion preventing material, such as wax, silica particles, a styrene-containing elastomeric block copolymer (e.g., a styrene-butadiene-styrene block copolymer), cellulose acetate, cellulose acetate butyrate or cellulose propionate, can be utilized.

Further, an antihalation layer may be formed.

It is desirable for the antihalation layer to have the maximal absorption of 0.3 to 2 in the desired wavelength region and, after processing, to have absorption of 0.001 to 0.5 in the visible region.

The dyes used as antihalation dyes may be any compounds so far as they have the intended absorption in the desired wavelength region, show sufficiently low absorption in the visible region after processing and provide the desirable absorbance spectral form desired for the antihalation layer. The dyes disclosed as antihalation dyes include the following ones, but the following should not be construed as limiting the antihalation dyes usable herein. Examples of a dye used independently include the compounds disclosed in JP-A-7-11432 and JP-A-7-13295, and those of a dye which is decolored by processing include the compounds disclosed in JP-A-52-139136 and JP-A-7-199409.

For the recording material having the foregoing image forming layer on one side of a support, it is desirable to further have a backing (back coat) layer on the other side of the support.

To the backing layer, a matting agent may be added with the intention of improving the transporting properties. In general, the matting agent is made up of fine particles of a water-insoluble organic or inorganic compound. Suitable examples of such an organic compound include a water-dispersible vinyl polymer such as polymethylmethacrylate, methyl cellulose, carboxyl starch and carboxynitrophenyl starch, and those of such an inorganic compound include silicon dioxide, titanium dioxide, magnesium dioxide, aluminum oxide and barium sulfate.

The matting agent has no particular limitation on the size and shape. However, it is desirable to use a matting agent having a grain diameter of 0.1 to 30 μm. The matte degree of the backing layer is desirably 250 to 10 seconds, expressed in terms of Bekk smoothness.

As a binder for forming the backing layer, various kinds of colorless transparent or translucent resins can be employed. Examples of such a resin include gelatin, gum arabic, polyvinyl alcohol, hydroxyethyl cellulose, cellulose acetate, cellulose acetate butyrate, casein, starch, poly(meth) acrylic acid, polymethylmethacrylic acid and polyvinyl chloride.

Also, it is desirable for the backing layer to have the maximal absorption of 0.3 to 2 in the desired wavelength region and, if desired, such an antihalation dye as used in the foregoing antihalation layer may be added to the backing layer.

The first recording material may have the backside resistive heating layer disclosed in U.S. Pat. No. 4,460,681 or U.S. Pat. No. 4,374,921 on the same side as the backing layer.

In addition to the foregoing various layers, this recording material may further have an antistatic or conductive layer using a soluble salt (e.g., chloride, nitrate), a metal-evaporated layer, a layer containing the ionic polymer disclosed in U.S. Pat. No. 2,861,056 and a layer containing the insoluble inorganic salt disclosed in U.S. Pat. No. 3,428,451.

As other examples of a recording material applicable to an apparatus according to the present invention, mention may be made of the following light- and heat-sensitive recording materials.

One of these light- and heat-sensitive recording materials (hereinafter referred to as "a second recording material") is a recording material having a light- and heat-sensitive recording layer on a support, and the light- and heat-sensitive recording layer contains an electron-donating colorless dyes encapsulated in heat-responsive microcapsules and, outside the heat-responsive microcapsules, a compound having both an electron-accepting part and a polymerizable vinyl monomer part in a molecule, and a photopolymerization initiator.

Another light- and heat-sensitive recording material (hereinafter referred to as "a third recording material") is a recording material having a light- and heat-sensitive recording layer on a support, and the light- and heat-sensitive recording layer contains an electron-donating colorless dyes encapsulated in heat-responsive microcapsules and, outside the heat-responsive microcapsules, an electron-accepting compound, a polymerizable vinyl monomer and a photopolymerization initiator.

When these recording materials are exposed to light, the composition present outside the heat-responsive microcapsules (hereinafter referred to as "the photosetting composition") undergoes curing and setting, and upon heating the compound having both electron-accepting part and polymerizable vinyl monomer part or the electron-accepting compound which has mobility (remains unset) moves about the light- and heat-sensitive layer and meets with an electron-donating colorless dye in microcapsules; as a result, a color develops from the colorless dye to form an image.

The compound having an electron-accepting part and a polymerizable vinyl monomer part which is used in the photosetting composition of the second recording material is a compound having both electron-accepting group and vinyl group in a molecule.

Suitable examples of such a compound include styrenesulfonylaminosalicylic acid, vinylbenzyloxyphthalic acid, zinc β-(meth)acryloxyethocysalicylate, hydroxyethyloxybenzoic acid, β-(meth)acryloxyethylorsellinate, β-(meth)acryloxyethoxyphenol, β-(meth)acryloxyethyl-β-resorcinate, hyroxystyrenesulfonic-acid-N-ethylamide, β-(meth)acryloxypropyl-p-hydroxybenzoate, (meth)acryloxymethylphenol, (meth)acrylamidopropanesulfonic acid, β-(meth)acryloxyethoxydihydroxybenzene, γ-styrenesulfonyloxy-β-(meth)acryloxypropanecarboxylic acid, γ-(meth)acryloxypropyl-α-hydroxyethyloxysalicylic acid, β-hydroxyethoxycarbonylphenol, 3,5-distyrenesulfonamidophenol, (meth)acryloxyethoxyphthalic acid, (meth)acrylic acid, (meth)acryloxyethoxyhydroxynaphthoic acid, β-(meth)acryloxyethyl-p-hydroxybenzoate, β'-(meth)acryloxyethyl-β-resorcinate, β-(meth)acryloxyethyloxycarbonylhydroxybenzoic acid, and metal salts (e.g., zinc salts) of the above-recited compounds.

These compounds can also be favorably used as polymerizable vinyl monomers to constitute the photosetting composition of the third recording material.

In addition to those compounds, various monomers having at least one vinyl group per molecule can be used as a polymerizable vinyl monomer to constitute the third recording material. For example, (meth)acrylic acid and salts thereof, (meth)acrylic acid esters and (meth)acrylamides; maleic anhydride and maleic acid esters; itaconic acid and itaconic acid esters; styrenes; vinyl ethers and vinyl esters; N-vinyl heterocyclic compounds; allyl ethers and allyl esters; and so on can be used. In particular, monomers having two or more vinyl groups per molecule are preferred over the others, with examples including (meth)acrylic acid esters of polyhydric alcohols, (meth)acrylic acid esters of polyhydric phenols and those of bisphenols, epoxy resins having terminal (meth)acrylate groups and polyesters having terminal (meth)acrylate groups. More specifically, those monomers include ethylene glycol diacrylate, ethylene glycol dimethacrylate, trimethylolpropane triacrylate, pentaerythritol tetraacrylate, dipentaerythritol hydroxypentaacrylate, hexanediol-1,5-dimethacrylate and diethylene glycol dimethacrylate.

The suitable molecular weight of those monomers is of the order of about 100 to about 5,000.

The photopolymerization initiator used in the second recording material and the third recording material (collectively referred to as "the recording material", hereinafter) is a compound capable of initiating the photopolymerization the foregoing vinyl monomers, preferably including salt compounds of organoborates which have sensitivities in the green and red to infrared wavelength regions and, when they are used in combination with dyes capable of absorbing green and red to infrared rays of light, can produce free radicals upon irradiation with light (See JP-A-62-143044), more preferably cationic dye salts of organoborates.

The salts compounds of organoborates produce free radicals in response to an irradiated laser beam, and these radicals initiate the polymerization of the aforementioned vinyl monomer part.

The compounds represented by the following formula (1) can be used as those salt compounds of organoborates:

(1)

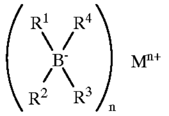

wherein M represents a cation selected from the group consisting of alkali metal atoms, quaternary ammonium, pyridinium. quinolinium, diazonium, morpholinium, tetrazolium, acridinium, phosphonium, sulfonium, oxosulfonium, sulfur, oxygen, carbon, halogenium, Cu, Ag, Hg, Pd, Fe, Co, Sn, Mo, Cr, Ni, As and Se; n is an integer of 1 to 6; $R^1$, $R^2$, $R^3$ and $R^4$ each represent a halogen atom, a substituted or unsubstituted alkyl group, a substituted or unsubstituted alkenyl group, a substituted or unsubstituted alkinyl group, an alicyclic group, a substituted or unsubstituted aryl group, a substituted or unsubstituted alkylaryl group, a substituted or unsubstituted aryloxyl group, a substituted or unsubstituted aralkyl group, a substituted or unsubstituted heterocyclic group, or a substituted or unsubstituted silyl group. Herein, $R^1$, $R^2$, $R^3$ and $R^4$ may be the same or different, and two or more of them may combine to form a cyclic structure. Examples of an organoborate anion in the foregoing formula (1) include tetraethylborate, triisobutylborate, di-n-butyl-di-t-butylborate, tetraphenylborate, tetra-p-chlorophenylborate, tri-m-chlorophenyl-n-hexylborate, triphenylethylborate, trimethylbutylborate, tritolylisopropylborate, triphenylbenzylborate, tetraphenylborate, tetrabenzylborate, triphenylphenetylborate, triphenyl-p-chlorobenzylborate, di(a-naphthyl)-dipropylborate, triphenylsilyltriphenylborate, tritoluylsilylphenylborate and tri-n-butyl(dimethylphenylsilyl)borate.

Examples of a salt compound of an organoborate represented by formula (1) are illustrated below.

(1)

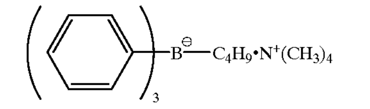

(2)

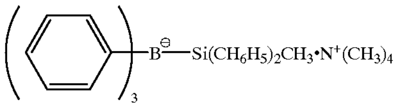

(3)

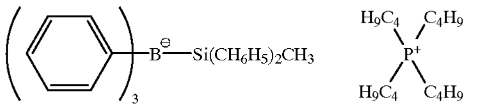

(4)

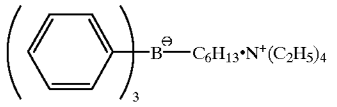

(5)

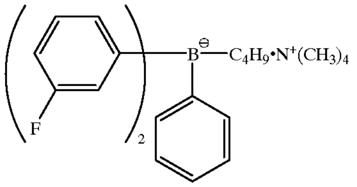

(6)

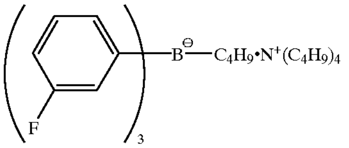

(7)

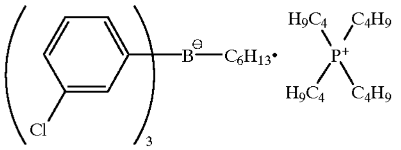

(8)

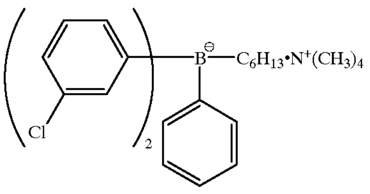

For heightening the absorption efficiency of light (recording light L), it is desirable that those salt compounds of organoborates represented by formula (1) be used in combination with spectral sensitizing dyes which can absorb light in the green to red region and the infrared region.

In particular, organic cationic dyes having their absorption maxima in the wavelength region of 500 to 1100 nm are advantageously used as spectral sensitizing dyes, with examples including cationic methine dyes, cationic carbonium dyes, cationic quinoneimine dyes, cationic indoline dyes and cationic styryl dyes. More specifically, the cationic methine dyes include polymethine dyes, cyanine dyes and azomethine dyes, preferably cyanine, carbocyanine, dicarbocyanine, tricarbocyanine and hemicyanine dyes; the cationic carbonium dyes include triarylmethane dyes, xanthene dyes and acridine dyes, preferably rhodamine; the cationic quinoneimide dyes preferably include azine dyes, oxazine dyes, thiazine dyes, quinoline dyes and thiazole dyes. These cationic dyes can be used alone or as a mixture of two or more thereof.

More preferably, the cationic dye salts of organoborates, which can be represented by the following formula (2), are used as photopolymerization initiator:

(2)

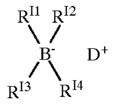

wherein $D^+$ represents a cationic dye, and $R^{11}$, $R^{12}$, $R^{13}$ and $R^{14}$ each represent a halogen atom, a substituted or unsubstituted alkyl group, a substituted or unsubstituted aryl group, a substituted or unsubstituted aralkyl group, a substituted or unsubstituted alkylaryl group, a substituted or unsubstituted alkenyl group, a substituted or unsubstituted alkinyl group, a substituted or unsubstituted aryloxy group, a substituted or unsubstituted alicyclic group, a substituted or unsubstituted heterocyclic group, a substituted or unsubstituted allyl group, or a substituted or unsubstituted silyl group. Herein, $R^{11}$, $R^{12}$, $R^{13}$ and $R^{14}$ may be the same or different, and two or more of them may combine to form a cyclic structure.

The cationic dye represented by $D^+$ in the foregoing formula (2) acts as a spectral sensitizing dye, and it is specifically an organic cationic dye having its absorption peak(s) at wavelengths of no shorterthan 500 nm, especially in thewavelength region of 500 to 1100 nm.

Examples of such an organic cationic dye include cationic methine dyes, cationic carbonium dyes, cationic quinoneimine dyes, cationic indoline dyes and cationic styryl dyes. More specifically, the suitable cationic methine dyes include polymethine dyes, cyanine dyes and azomethine dyes, preferably cyanine, carbocyanine, dicarbocyanine, tricarbocyanine and hemicyanine dyes; the suitable cationic carbonium dyes include triarylmethane dyes, xanthene dyes and acridine dyes, preferably rhodamine; the suitable cationic quinoneimide dyes include azine dyes, oxazine dyes, thiazine dyes, quinoline dyes and thiazole dyes.

The borate anions which can be favorably used for formula (2) include the same ones as recited in the illustration of formula (1).

Examples of a cationic dye salt of an organoborate represented by (2) are illustrated below:

(1)
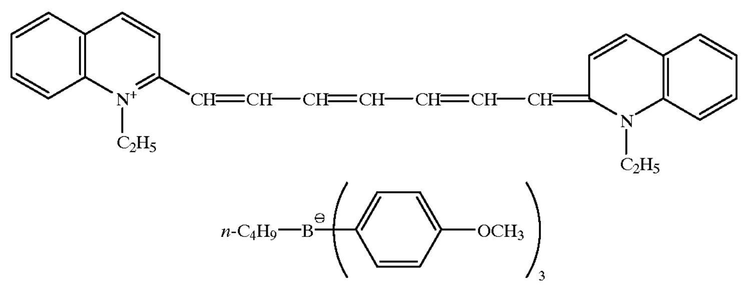
(2)
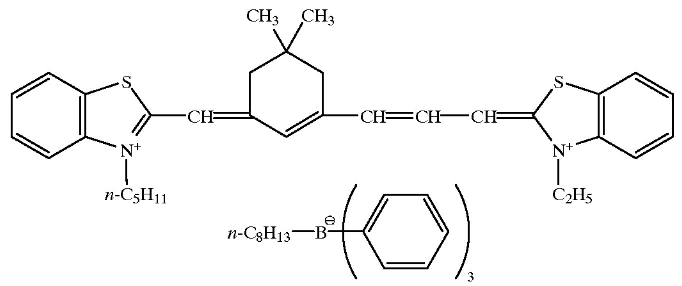
(3)
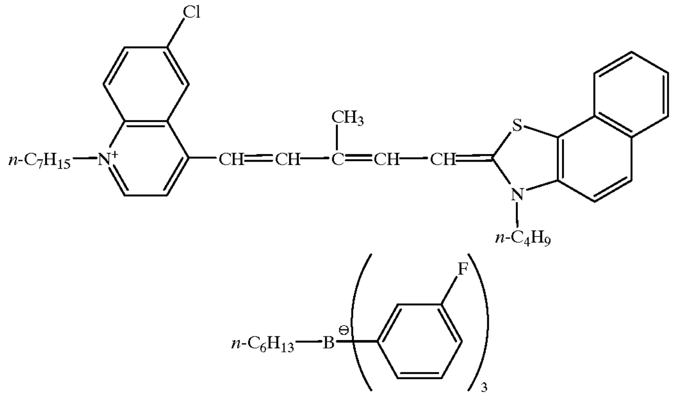
(4)
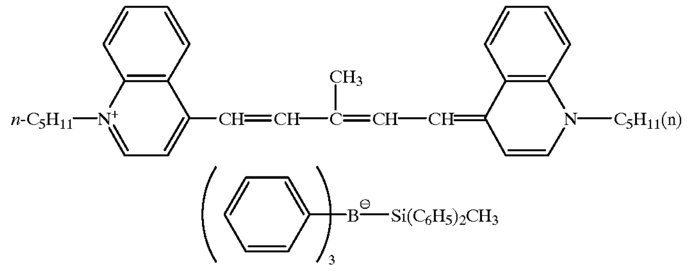

-continued (5)

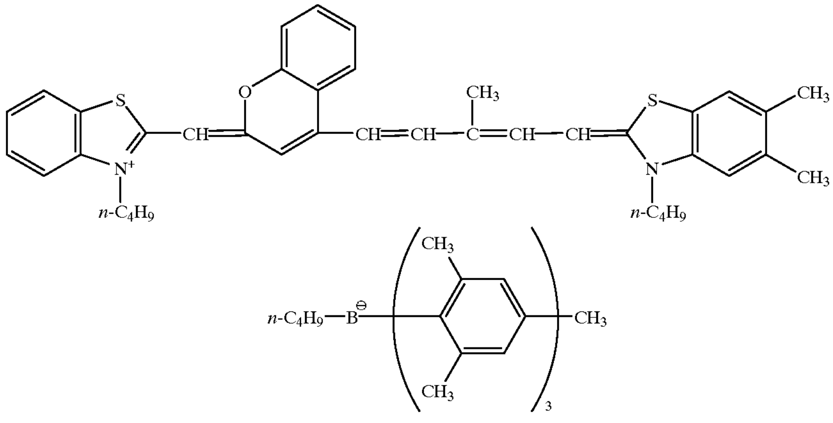

(6)

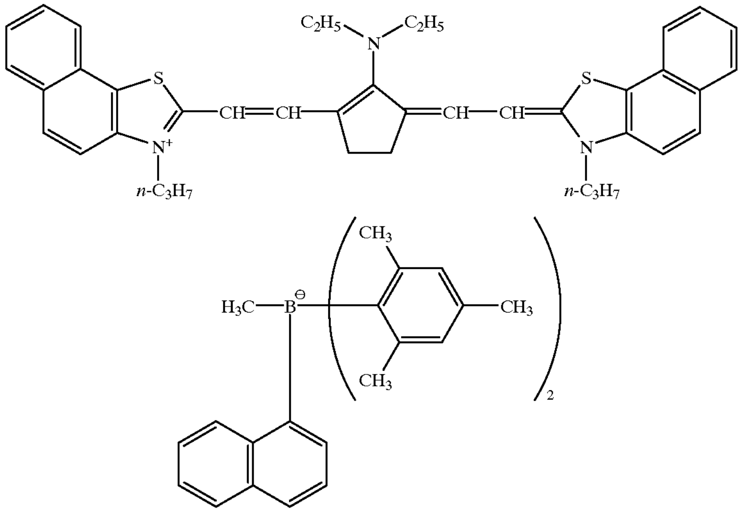

The suitable amount of a photopolymerization initiator used is from 0.01 to 20 weight %, based on the total weight of the photosetting composition (outside the heat-responsive microcapsules).

In this recording material, the compound having an active halogen radical in a molecule represented by the following formula (3) or (4) can be used as an assistant in combination with the foregoing photopolymerization initiator and spectral sensitizing dyes:

(3)

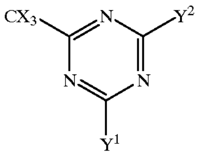

wherein X represents a halogen atom, $Y^1$ represents $—CX_3$, $—NH_2$, —NHR, $—NR_2$ or —OR (wherein R represents an alkyl group, a substituted alkyl group, an aryl group or a substituted aryl group), and $Y^2$ represents $—CX_3$, an alkyl group, a substituted alkyl group, an aryl group, a substituted aryl group or a substituted alkenyl group. The substituent for the group represented by $Y^1$ or $Y^2$ has may be the compound of formula (3) itself;

(4)

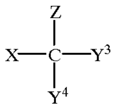

wherein X represents a halogen atom, $Y^3$ and $Y^4$, which may be the same or different, each represents a hydrogen atom or a halogen atom, and Z represents a group of the following formula,

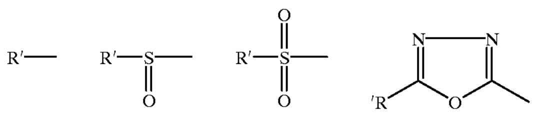

wherein R' represents a hydrogen atom, a halogen atom, an alkyl group, a substituted alkyl group, an aryl group, a substituted aryl group, a substituted alkenyl group, a heterocyclic group or a substituted heterocyclic group.

Of the compounds represented by formula (3), the compounds having $—CX_3$ as $Y^1$ are used to advantage.

Suitable examples of a compound represented by formula (3) include 2-phenyl-4,6-bis(trichloromethyl)-s-triazine, 2-(p-chlorophenyl)-4,6-bis(trichloromethyl)-s-triazine, 2-(p-methoxyphenyl)-4,6-bis(trichloromethyl)-s-triazine, 2,4,6-tris(trichoromethyl)-s-triazine, 2-(p-cyanophenyl)-4,6-bis(trichloromethyl)-s-triazine, and 2-(p-acetylphenyl)-4,6-bis(trichloromethyl)-s-triazine.

On the other hand, examples of a compound represented by formula (4) include carbon tetrachloride, carbon tetrabromide, iodoform, p-nitro-α,α,α-tribromoacetophenone, ω,ω,ω-tribromoquinaldine, tribromomethylphenylsulfone and trichloromethylsulfone.

It is desirable that the compound represented by formula (3) or (4) be added in an amount of 0.01 to 20 mole per mole of spectral sensitizing dye (cationic dye).

Although it has high sensitivity and spectral sensitivities in the infrared region, this recording material may further contain as the assistant for acceleration of the latent-image formation a reducing agent, such as an oxygen scavenger and an active hydrogen donor chain transfer agent, and other compounds.

Examples of an oxygen scavenger which is known to be effective as the assistant for acceleration of latent-image formation include phosphine, phosphonate, phosphite, stannous salts, and other compounds which are liable to be oxidized by oxygen, such as N-phenylglycine, trimethylbarbituric acid and N,N-dimethyl-2,6-diisopropylaniline.

The photosetting composition of the third recording material is admixed an electron-accepting compound. To the photosetting composition of the second recording material may be added an electron-accepting compounds, if desired. Thereby, the developed color density can be heightened.

Examples of an electron-accepting compound include phenol derivatives, salicylic acid derivatives, metal salts of aromatic carboxylic acids, acid clay, bentonite, novolak resins, metal-treated novolak resins and metal complexes. Additionally, examples of a phenol derivative include 2,2'-bis(4-hydroxyphenyl)propane, 4-t-butylphenol, 4-phenylphenol, 4-hydroxydipheninoxide, 1,1'-bis(3-chloro-4-hydroxyphenyl)cyclohexane and 1,1'-bis(3-chloro-4-hydroxyphenyl)-2-ethylbutane; while those of a salicylic acid derivative include 4-pentadecylsalicylic acid, 3,5-di(α-methylbenzyl)salicylic acid, 3,5-di(tert-octyl)salicylic acid, 5-octadecylsalicylic acid, 5-α-(p-α-methylbenzylphenyl) ethylsalicylic acid, 3-α-methylbenzyl-5-tert-octylsalicylic acid and 5-tetradecylsalicylic acid.

It is desirable for such an electron-accepting compound to be used in a proportion of about 5 to about 1,000 weight % to the electron-donating colorless dye.

To the photosetting composition used in the aforementioned recording materials may further be added a photocrosslinking composition, such as polyvinyl cinnamate, polycinnamylidenevinyl acetate and a photosetting composition having an a-phenylmaleimido group. On the other hand, these photo-crosslinking compositions may be used as a photosetting constituent.

Furthermore, with the intention of preventing the photosetting composition from undergoing thermal and aging polymerization to enhance the stability, a thermal polymerization inhibitor may be added to the photosetting composition, if desired.

Suitable examples of a thermal polymerization inhibitor include p-methoxyphenyl, hydroquinone, t-butylcatechol, pyrogallol, 2-hydroxybenzophenone, 4-methoxy-2-hydroxybenzophenone, cuprous chloride, phenothiazine, chloranil, naphthylamine, β-naphthol, 2,6-di-t-butyl-p-cresol, nitrobenzene, dinitrobenzene, picric acid and p-toluidine. It is desirable for such a thermal polymerization inhibitor to be added in a proportion of the order of 0.001–5 weight % to the total photosetting composition.

The photosetting composition is dispersed in an emulsion state, and incorporated into a light- and heat-sensitive recording layer.

Examples of a solvent usable for the emulsified dispersion of the photosetting composition include cotton seed oil, kerosene, aliphatic ketones, aliphatic esters, paraffin, naphthene oil, alkylated biphenyls, chlorinated paraffin, diarylethanes such as 1,1'-ditolylethane, alkyl esters of phthalic acid such as dibutyl phthalate, phosphoric acid esters such as diphenyl phosphate, citric acid esters such as tributyl acetylcitrate, benzoic acid esters such as octyl benzoate, alkylamides such as diethyllaurylamide, acetic acid esters such as ethyl acetate, acrylic (methacrylic) acid esters such as methyl acrylate, alkyl halides such as methylene chloride and carbon tetrachloride, methyl isobutyl ketone, β-ethoxyethylacetate, and methyl cellosolve acetate. Of these solvents, aliphatic esters and alkyl halides, especially those having the solubility of not more than 10 volume % in water, are preferred over the others.

Those solvents are used in a proportion of 1 to 500 parts by weight to the photopolymerizable compound.

The water-soluble polymers usable for the emulsified dispersion of the photosetting composition are preferably compounds which are dissolved in 25° C. water in a concentration of at least 5 weight %. Examples of such a polymer include proteins, such as gelatin, gelatin derivatives and albumin, cellulose derivatives such as methyl cellulose, sugar derivatives such as starch (including denatured starch), and synthetic polymers such as polyvinyl alcohol, hydrolysis products of a styrene-maleic anhydride copolymer, carboxyl-modified polyvinyl alcohol, polyacrylamide, saponified products of a vinyl acetate-polyacrylic acid copolymer and polystyrenesulfonate. In particular, gelatin and polyvinyl alcohol are used to advantage.

As the electron-donating colorless dye, which is encapsulated in the microcapsules of the light- and heat-sensitive recording layer of the recording material, can be used various known colorless dyes, including triphenylmethane phthalide compounds, fluoran compounds, phenothiazine compounds, indolyl phthalide compounds, leuco Auramine compounds, Rhodamine lactam compounds, triphenylmethane compounds, triazene compounds, spiropyran compounds and fluorene compounds.

More specifically, examples of a triphenylmethane phthalide compounds include 3,3-bis(p-dimethylaminophenyl)-6-dimethylamonophthalide and 3-(p-dimethylaminophenyl)-3-(2-methylindol-3-yl)phthalide; examples of a leuco Auramine compound include N-halophenyl-leuco-Auramine and N-2,4,5-trichlorophenyl-leuco-Auramine; examples of a Rhodamine lactam compound include Rhodamine B anilinolactam and Rhodamine (p-nitrilo) lactam; examples of a fluoran compound include 2-(dibenzylamino)fluoran, 2-anilino-3-methyl-6-diethylaminofluoran and 2-anilino-3-methyl-6-N-methyl-N-cyclohexylaminofluoran; examples of a phenothiazine compound include benzoyl leuco Methylene Blue and p-nitrobenzyl leuco Methylene Blue; and examples of a spiropyran compound include 3-methyl-spiro-dinaphthopyran and 3,3'-dichloro-spiro-dinaphthopyran.

When this recording material is designed for full-color recording, U.S. Pat. No. 4,900,149 can be referred to for details of electron-donating colorless dyes to develop cyan, magenta and yellow colors respectively, U.S. Pat. No. 4,800,148 can be referred to for details of those of yellow color-forming type, and JP-A-63-53542 can be referred to for details of those of cyan color-forming type.

The microencapsulation of such an electron-donating colorless dye can be effected using methods known in the art.

For instance, the method of utilizing the coacervation of a hydrophilic wall-forming material as disclosed in U.S. Pat. No. 2,800,457, the interfacial polymerization method disclosed in JP-B-42-771, the method of utilizing the polymer deposition as disclosed in U.S. Pat. No. 3,660,304, the method of using an isocyanate polyol wall material as disclosed in U.S. Pat. No. 3,796,669, the method of using an isocyanate wall material as disclosed in U.S. Pat. No. 3,914,511, and the method of using a wall forming material of ureaformaldehyde-resorcinol type as disclosed in U.S. Pat. No. 4,089,802 can be adopted. In particular, it is desirable that a core material be first emulsified and then a polymer film be formed as a microcapsule wall.

In particular, the method of microencapsulation by polymerization of a reactant from the interior of oil droplets is used to advantage because it can form microcapsules uniform in particle diameter and ensure excellent keeping quality in the recording material.

For instance, in the case of using polyurethane as a wall material, a polyisocyanate and the second substance (e.g., a polyol or a polyamine) which can form a capsule wall by reacting with the polyisocyanate are mixed in an oily liquid to be encapsulated, and the resulting liquid is dispersed into water in an emulsified state and then heated. As a result, polymer forming reaction is caused at the surface of oil droplets and forms a microcapsule wall. Therein, an auxiliary solvent having a low boiling temperature and a strong dissolving power can be used in the oily liquid.

Various polyisocyanates used in the production of known urethane resins can be utilized as those for the foregoing case, and examples thereof include m-phenylenediisocyanate, 2,6-tolylenediisocyanate, 2,4-tolylenediisocyanate, diphenylmethane-4,4-diisocyanate, xylylene-1,4-diisocyanate, 4,4'-diphenylpropanediisocyanate and trimethylenediisocyanate, hexamethylenediisocyanate. Additionally, those polyisocyanates can form high molecular substances by reacting with water, too.

As for the polyols also, various polyols used in the production of known urethane resins, including aliphatic polyhydric alcohols, aromatic polyhydric alcohols, hydroxypolyesters and hydroxypolyalkylene ethers, can be utilized. More specifically, ethylene glycol, 1,3-propanediol, 1,4-butanediol, 1,5-pentanediol, 1,6-hexanediol, propylene glycol, 2,3-dihydroxybutane, 1,2-dihydroxybutane, 2,5-hexanediol, 3-methyl-1,5-pentanediol, dihydroxycyclohexane and the like can be used as the polyols for the foregoing case. Additionally, it is desirable for the polyol to be used in such an amount that the ratio of the hydroxyl group to the isocyanate group is of the order of 0.02 to 2 by mole.

Examples of a polyamine which can be used in the foregoing case include ethylenediamine, trimethylenediamine, tetramethylenediamine, pentamethylenediamine, hexamethylenediamine, p-(m-) phenylenediamine, piperazine and its derivatives, 2-hydroxytrimethylenediamine, diethyltriamine, triethylenetriamine, triethylenetetramine, tetraethylenepentamine and amine adducts of epoxy compounds.

Also, microcapsules can be formed using a water-soluble high molecular compound. This water-soluble high molecular compound may be any of water-soluble anionic, nonionic and amphoteric high molecular compounds.

Examples of a water-soluble anionic high molecular compound include high molecular compounds having —COO— or —$SO_2$— groups, such as gum arabic, alginic acid, sulfated starch, sulfated cellulose, gelatin derivatives such as phthaloylated gelatin, acrylic (methacrylic) acid (co) polymers, vinylbenzenesulfonic acid (co)polymers and carboxyl-modified polyvinyl alcohol. Examples of a water-soluble nonionic high molecular compound include polyvinyl alcohol, hydroxyethyl cellulose and methyl cellulose. As an example of a water-soluble amphoteric high molecular compound, mention may be made of gelatin. Of those water-soluble high molecular compounds, gelatin, gelatin derivatives and polyvinyl alcohol are preferred over the others.

Those water-soluble high molecular compounds are used as a 0.01 to 10 weight % aqueous solution.

The microcapsules in this recording material have an average diameter of 20 Am or below, and the average diameter of 5 μm or below is especially desirable for them from the viewpoint of resolution. When the diameter of each microcapsule is too small, the ratio of the surface area to the definite solids content becomes too great; as a result, a large quantity of wall material is required. Therefore, the average diameter of microcapsules is preferably at least 0.1 μm.

The electron-donating colorless dyes may be present in a state of solution in microcapsules, or in a state of solid.

The former state can be brought about by dissolving an electron-donating colorless dye in a solvent and microencapsulating the dye in the dissolved condition. The suitable proportion of the solvent used therein is from 1 to 500 parts by weight per 100 parts by weight of the electron-donating colorless dye. The solvent used at the time of the microencapsulation can be the same as used for emulsification of the aforementioned photosetting composition. In addition, volatile solvents such as acetate solvents may be used as an auxiliary solvent for dissolving electron-donating colorless dyes at the time of microencapsulation.

Besides the light- and heat-sensitive recording layer, the recording material may have various layers such as a protective layer and an interlayer. To the protective layer, the addition of a matting agent is desirable.

Examples of a matting agent usable for the protective layer include inorganic particles, such as those of silica, magnesium oxide, barium sulfate and strontium sulfate; resin particles, such as those of polymethylmethacrylate, polyacrylonitrile and polystyrene; and starch particles, such as those of carboxystarch and corn starch. In particular, polymethylmethacrylate particles and silica particles are preferred as the matting agent. As for the silica particles, Syloid A series produced by FUJI-DEVISON CHEMICAL LTD. Ltd. are usable.

The suitable particle diameter of a matting agent is from 1 to 20 μm, and the addition amount thereof is preferably from 2 to 500 $mg/m^2$.

In each of the constituent layers of the recording material, including light- and heat-sensitive layers, interlayers and protective layers, it is desirable to use a hardener. In particular, it is preferable to add a hardener to the protective layer and thereby to decrease the tackiness of the protective layer.

For instance, the useful hardeners are "gelatin hardeners" used for the production of photographic materials. Suitable examples of such a gelatin hardener include chromium alum, zirconium sulfate, boric acid, 1,3,5-triacryloyl-hexahydro-s-triazine, 1,2-bisvinylsulfonylmethane, 1,3-bis(vinylsulfonylmethyl)propanol-2, bis(α-vinylsulfonylacetamido)ethane, sodium salt of 2,4-dichloro-6-hydroxy-s-triazine and 2,4,6-triethylenimino-s-triazine.

The suitable proportion of a hardener in each constituent layer is of the order of 0.5 to 5 weight % to the binder.

To the protective layer, colloidal silica may be added in order to further decrease its tackiness.

Examples of usable colloidal silica include Snowtex 20, Snowtex 30, Snowtex C, Snowtex O and Snowtex N, produced by Nissan Chemicals Industries, Ltd. The suitable proportion of colloidal silica therein is of the order of 5 to 80 weight % to the binder.

To the protective layer, a fluorescent brightening agent for heightening the whiteness of the recording material and a blue dye as a blueing agent may further be added.

When this recording material is designed for a multicolor recording material, the recording material may have a multi-layer structure wherein one layer differs from another layer in the hue of color developed from microencapsulated electron-donating colorless dye and the wavelength of light to which the photosetting composition has the sensitivity, and optionally an interlayer containing a filter dye may be arranged between different light- and heat-sensitive layers.

The interlayer contains a binder and a filter dye as main components, and can further contain additives such as a hardener and a polymer latex.

The filter dyes which can be used in the present recording material can be dispersed in an emulsified state using an oil-in-water dispersion method or a polymer dispersion method, and added to the intended layers, especially interlayers. According to the oil-in-water dispersion method, a filter dye is first dissolved in either a high boiling organic solvent having a boiling point of at least 175° C. or the so-called auxiliary solvent having a boiling point of 30° C. to 160° C., or in a mixture of these solvents and then finely dispersed into an aqueous medium, such as water or an aqueous solution of gelatin or polyvinyl alcohol, in the presence of a surfactant.

The processes of a latex dispersion method and examples of a latex for hardening and impregnation are described in U.S. Pat. No. 4,199,383. Suitable examples of a latex include latexes obtained by copolymerizing acrylic acid (methacrylic acid) esters, such as ethyl acrylate, and acid monomers, such as acrylic acid.

Examples of a binder which can be used in each constituent layer of the recording material, such as a protective layer, a light- and heat-sensitive layer or an interlayer, include water-soluble high molecular compounds which can be used for emulsifying dispersion of a photosetting composition and microencapsulation of an electron-donating colorless dye. Further, they include solvent-soluble polymers, such as polystyrene, polyvinyl formal, polyvinyl butyral, polyvinyl alcohol, acrylic resins (e.g., polymethylmethacrylate), phenol resins, ethyl cellulose, epoxy resins, urethane resins, and latexes of these polymers. Of these binders, gelatin and polyvinyl alcohol are preferred over the others.

In each constituent layer of the recording material, various surfactants may be used for various purposes, e.g., as a coating aid, and for prevention of electrification, improvement of slippability, emulsifying dispersion, prevention of adhesion, and so on.

As surfactants, for example, nonionic surfactants, such as saponin, polyethylene oxides and derivatives thereof, alkylsulfonates, alkylsulfates, N-acyl-N-alkyltaurines and sulfosuccinates, various anionic surfactants, amphoteric * surfactants, such as alkylbetaines and alkylsulfobetaines, and cationic surfactants, such as aliphatic or aromatic quaternary ammonium salts, can be used, if needed.

In addition to the additives mentioned above, dyes for prevention of irradiation and halation, ultraviolet absorbents, plasticizers, fluorescent brightening agents, coating aids, curing agents, antistatic agents and slippability improvers may be added, if needed.

The first recording material having the aforementioned characteristic image forming layer, and the second and third recording materials having the aforementioned light- and heat-sensitive recording layers can be produced by preparing coating compositions (emulsions) using ingredients for individual constituent layers and, if needed, solvents as well, and coating those compositions using known means and then drying them.

As such solvents, various solvents known to be usable for recording materials can be employed, with examples including water, alcohols such as ethanol and isopropanol, halogen-containing solvents such as ethylene chloride, ketones such as cyclohexanone and methyl ethyl ketone, esters such as methyl cellosolve acetate and ethyl acetate, toluene and xylene. These solvents may be used as a mixture of two or more thereof, if desired. Further, various surfactants, including nonionic, anionic, cationic and fluorine-containing surfactants, may be added to the coating compositions with the intention of improving the coatability and the electrifying properties.

As the coating means, known means such as a blade coater, a rod coater, a knife coater, a roll doctor coater, a reverse roll coater, a transfer roll coater, a gravure coater, a kiss roll coater and a curtain coater can be employed. Additionally, the amount of each coating composition coated is adjusted, of course, so that the amount of each layer attached after drying will be a predetermined amount.

In addition, these recording materials have no particular restriction as to the support to be a constituent thereof, but various supports used for general recording materials can be employed therein also. Examples of a usable support include resin films such as a polyester film, a polyethylene terephthalate film, a polyethylene naphthalate film, a cellulose nitrate film, a cellulose ester film, a polyvinyl acetal film and a polycarbonate film, and sheets of various metals, such as aluminum and zinc, glass and paper.

The present invention will now be illustrated in more detail by reference to an example. In this example, the first recording material is employed.

EXAMPLE

Preparation of Organic Silver Salt Dispersion:

Behenic acid and stearic acid in amounts of 40 g and 7.3 g respectively, and 500 ml of water were mixed with stirring for 15 minutes at 90° C., and thereto 187 ml of 1N NaOH was added over a 15-minute period. This mixture was further admixed with 61 ml of a 1N aqueous nitric acid, and the temperature was dropped to 50° C. Thereto, 124 ml of a 1N aqueous $AgNO_3$ solution was added over a 2-minute period, and the stirring was continued for 30 minutes. Thereafter, the solid matter was filtered with suction, and washed. This operation was repeated till the conductivity of the filtrate became 30 $\mu$S/cm. The thus obtained solid matter was not dried and treated as wet cake. This wet cake was admixed with polyvinyl alcohol (PVA-205, trade name) in an amount of 10 g per 100 g of the solid matter after drying, and further admixed with water in an amount to make the total weight 500 g. This mixture was subjected to preliminary dispersion using a homomixer.

Then, the pre-dispersed composition obtained above was processed three times with a dispersing machine (Microfluidizer M-110S-EH, trade name, made by Microfluidex International Corporation, wherein G10Z Interaction Chamber is used) under the pressure controlled to 1750 kg/cm$^2$. Thus, a dispersion of organic silver salt microcrystals having a volume weighted average diameter of 0.39 pm was prepared. The grain size determination was made with Master Sizer X made by Malvern Instruments Ltd.

Preparation of Silver Halide Grains:

A solution containing 22 g of phthaloylated gelatin and 30 mg of potassium bromide in 700 ml of water was adjusted to pH 5.0 at 40° C., and thereto 159 ml of an aqueous solution containing 18.6 g of silver nitrate and an aqueous solution of potassium bromide were added over a 10-minute period as the pAg was kept at 7.7 in accordance with the controlled double jet method. Thereto, 476 ml of an aqueous solution containing 55.4 g of silver nitrate and an aqueous solution containing 8 pm mole/l of dipotassium hexachloroiridate and 1 mole/l of potassium bromide were further added over a 30-minute period as the pAg was kept at 7.7 in accordance with the controlled double jet method. Then, the pH of the resulting solution was lowered to cause flocculation, thereby effecting a desalting treatment. The thus desalted matter was admixed with 0.1 g of phenoxyethanol, and adjusted to pH 5.9 and pAg 8.0. The thus prepared grains were cubic grains having the average size of 0.07 μm, the variation coefficient of 8% regarding the projected area diameter, and the (100) surface proportion of 86%.

The silver halide grains prepared above were heated up to 60° C., and thereto were added 85 pmole/mole silver of sodium thiosulfate, 11 pmole/mole silver of 2,3,4,5,6-pentafluorophenyldiphenylphosphine selenide, 2 pmole/mole silver of Tellurium Compound 1 illustrated below, 3.3 pmole/mole silver of chloroauric acid and 230 Kmole/mole silver of thiocyanic acid. The resultant mixture was ripened for 120 minutes.

Thereafter, the temperature of the mixture was changed to 40° C., and admixed with $3.5\times10^{-4}$ mole/mole silver of the following sensitizing dye A with stirring. After a lapse of 5 minutes, the following Compound A was further added in an amount of $4.6\times10^{-3}$ mole per mole of silver halide, stirred for 5 minutes, and then quenched rapidly to 25° C., thereby preparing silver halide grains.

Sensitizing Dye A:

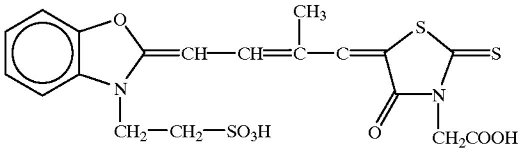

Compound A:

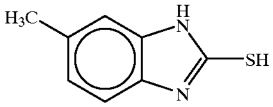

Tellurium Compound 1:

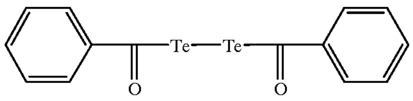

Preparation of Dispersions of Solid Fine-Particle Ingredients:

Solid fine-particle dispersions of tetrachlorophthalic acid, 1,1-bis(2-hydroxy-3,5-dimethylphenyl)-3,5,5-trimethylhexane and tribromomethylphenylsulfon respectively were prepared as follows:

To 2.5 g of tetrachlorophthalic acid were added 0.81 g of hydroxymethyl cellulose and 94.2 ml of water, and stirred thoroughly. The thus obtained slurry was allowed to stand for 10 hours. Thereafter, the slurry was placed in a vessel together i with 100 ml of zirconia beads having an average diameter of 0.5 mm, and dispersed for 5 hours with a dispersing machine (1/4G Sand Grinder Mill, made by Imex Co., Ltd.) to prepare a solid -fine-particle dispersion of tetrachlorophthalic acid. In this dispersion, 70 wt % of the total grains had a diameter of 1.0 μM or below.

The dispersions of the other ingredients were prepared in the similar manner to the above, except that the amount of a dispersing agent used and the dispersing time for obtaining the intended average grain diameter were changed properly.

Preparation of Fine-Particle Polymer Dispersion containing Dye:

The mixture of 2 g of the following Dye A, 6 g of methyl methacrylate/methacrylic acid (85/15) copolymer and 40 ml of ethyl acetate was made into a solution by heating to 60° C., and thereto was added 100 ml of an aqueous solution containing 5 g of polyvinyl alcohol. This mixture was finely dispersed for 5 minutes at 12,000 r.p.m. with a high-speed stirrer (Homogenizer, made by Nippon Seiki Co., Ltd.). Thus, the Dispersion P of polymer fine particles having an average size of 0.3 μm was prepared.

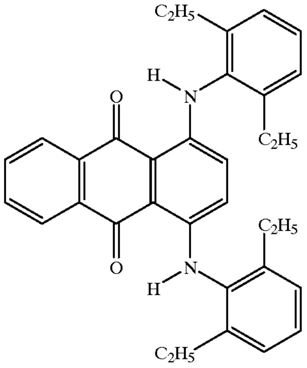

Preparation of Coating Composition for Emulsion Layer:

To the previously prepared dispersion of organic silver salt microcrystals (in an amount of 1 mole based on silver) were added the foregoing silver halide grains in a proportion of 10 mole % to the organic silver salt, the following binder, the following ingredients for development and the following dye, and thereby a coating composition for an emulsion layer was prepared. Binder: SBR latex, Laxter 3307B (a product of Dai-Nippon Ink & Chemicals, Inc.), in an amount of 430 g.

Ingredients for Development:

The foregoing dispersion of tetrachlorophthalic acid in an amount of 5 g, based on tetrachlorophthalic acid. The foregoing dispersion of 1,1-bis(2-hydroxy-3,5-dimethylphenyl)-3,5,5-trimethylhexane in an amount of 98 g, based on this ingredient.

Phthalazine in an amount of 9.2 g.

The foregoing dispersion of tribromomethylphenylsulfone in an amount of 12 g, based on this ingredient.

4-Methylphthalic acid in an amount of 7 g.

Dye:

The foregoing fine-particle polymer dispersion containing Dye A in an amount of 4 g, based on the dye.

Additionally, Laxter 3307B used above is a styrene-butadiene copolymer latex, and the average diameter of dispersed particles is of the order of 0.1 to 0.15 μm.

Preparation of Coating Composition for Protective Layer on Emulsion Side:

To 10 g of inert gelatin were added 0.26 g of Surfactant A illustrated below, 0.09 g of Surfactant B illustrated below, 0.9 g of silica fine grains (average size: 2.5 μm), 0.3 g of 1,2-(bisvinylsulfonylacetamido)ethane and 64 g of water. Thus, a coating composition for protecting the emulsion surface was obtained.

Surfactant A:

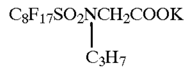

Surfactant B:

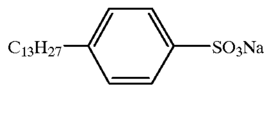

Preparation of Dye Dispersion:

The following Dye B in an amount of 0.8 g was added to 35 g of ethyl acetate, and dissolved therein with stirring. This solution was admixed with 85 g of a 6 weight % solution of polyvinyl alcohol (PVA-217), and stirred for 5 minutes with a homogenizer. Therefrom, the ethyl acetate was removed by evaporation, and the residue was diluted with water. Thus, a dye dispersion was prepared.

Dye B

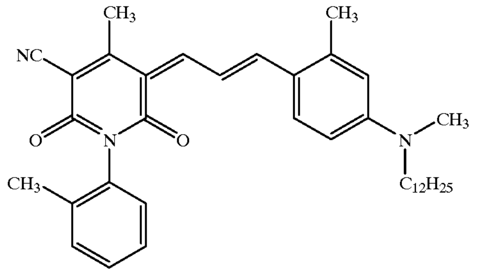

Preparation of Dispersion of Solid Fine-Particle Base:

To 26 g of the following solid base was added a 2 wt % of water solution of polyvinyl alcohol (PVA-215), and stirred thoroughly. The thus obtained slurry was allowed to stand for 10 hours. Thereafter, the slurry was placed in a vessel together with 100 ml of zirconia beads having an average diameter of 0.5 mm, and dispersed for 5 hours with a dispersing machine (¼G Sand Grinder Mill, made by Imex Co., Ltd.) to prepare a dispersion of solid fine-particle base.

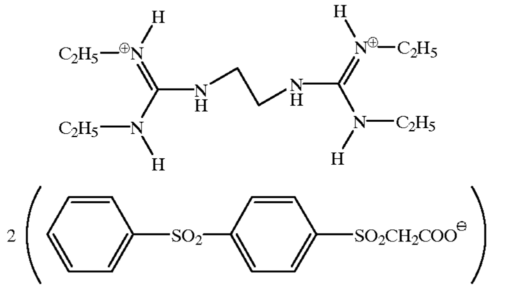

Preparation of Composition to be coated on Back Side:

To 38 g of a 10% gelatin solution were added 20 g of the previously prepared dye dispersion, 20 g of the dispersion of solid fine-particle base and 35 g of water, and used as a coating composition to be coated on the back side.

Preparation of Coating Composition for Protection of Back Side:

To 10 g of inert gelatin were added 0.26 g of the foregoing Surfactant A, 0.09 g of the foregoing Surfactant B, 0.3 g of 1,2-(bisvinylsulfonylacetamido)ethane, 0.4 g of very spherical silica having the average size of 12 Ftm (Sildex H121, trade name, a product of Dokai Chemical, Ltd.), and 64 g of water. Thus, a coating composition for protecting the back side was prepared.

Preparation of Photosensitive Material:

The Coating Composition prepared above for emulsion layer was coated on a 175 μm-thick polyethylene terephthalate support at a silver coverage of 2.2 $g/m^2$, and then the coating composition for protection of the emulsion surface was coated at a coverage of 1.8 g based on gelatin. After drying, the back-side coating composition prepared above was coated on the side opposite the emulsion layer at a coverage of 56 $mg/M^2$ based on Dye B. Further, the foregoing coating composition for protecting the back side was coated at a gelatin coverage of 1.8 $g/m^2$. Thus, a sample of the first recording material was produced.

The thus obtained recording material was loaded on the heat development apparatus 10 shown in FIG. 1, and the image formation therein was performed. As a result, high-quality images free from development streaks were obtained.

Further, the thus obtained recording material was subjected to image formation using the heat development apparatus 10 shown in FIG. 10. The dust removing roller 124 used was a tacky roller made of a butyl rubber.

As a results, high-quality images free from dot image defects were obtained.

As explained above, the image recording apparatus of the embodiment according to the present invention is capable of always keeping its heat development part clean because the heat development part is equipped with a cleaning mechanism. Therefore, the apparatus can form high-quality images over a prolonged period of time.

Further, according to another embodiment of the heat development apparatus of the present invention, the surface of the heating drum is always kept clean by the dust removing means, and the deterioration in image quality by the adhesion of dust particles does not occur.

While the invention has been described in detail and with reference to specific embodiments thereof, it will be apparent to one skilled in the art that various changes and modifications can be made therein without departing from the spirit and scope thereof.

What is claimed is:

1. An image recording apparatus for forming an image on a heat development photosensitive material or a light- and heat-sensitive recording material through a dry processing, said image recording apparatus comprising:

a storage part in which the recording material is stored;

latent-image forming means which forms a desired latent image on the recording material conveyed from the storage part;

heat development means which develops the recording material and comprises a heating member for heating at a given temperature the recording material conveyed from the latent-image forming means and a press contact member for pressing the recording material against the heating member; and cleaning means which cleans a contact surface of at least one of the heating member and the press contact member which comes into contact with the recording material, wherein the cleaning means has (i) a cleaning sheet which comes into tight contact or sliding contact with the contact surface to thereby clean the surface and (ii) a cleaning sheet conveyance circuit, the contact surface being present within the circuit.

2. The image recording apparatus of claim 1, wherein the cleaning means has control means having a cleaning mode in which the latent-image forming part is inhibited from operating to form a latent image and the cleaning sheet stored beforehand in the storage part is conveyed to the heat development part by a conveyance means and brought into tight contact or sliding contact with the contact surface to thereby clean the contact surface.

3. The image recording apparatus of claim 2, wherein the control means comes into the cleaning mode upon power turning on.

4. The image recording apparatus of claim 2, wherein the control means has a cleaning instruction switch for receiving instructions from a user for the execution of cleaning, and comes into the cleaning mode upon reception through the cleaning instruction switch of the instructions for the execution of cleaning.

5. The image recording apparatus of claim 1, wherein the cleaning sheet is placed on top of a set of a given number of sheets of the recording material to be loaded in the storage part, and the control means comes into the cleaning mode when the set of sheets of the recording material is freshly loaded in the storage part.

6. The image recording apparatus of claim 1, wherein the cleaning means has a cleaning sheet which comes into sliding contact with the contact surface to thereby clean the surface.

* * * * *